(12) United States Patent
Tanimichi et al.

(10) Patent No.: US 8,103,451 B2
(45) Date of Patent: Jan. 24, 2012

(54) VEHICLE SAFETY CONTROL APPARATUS FOR AVOIDING COLLISION

(75) Inventors: Taisetsu Tanimichi, Mito (JP); Tatsuya Yoshida, Naka (JP); Mikio Ueyama, Ohira (JP); Shinya Ohtsuji, Tokai (JP); Isa Ismet Khumaedi, Hitachinaka (JP); Takahide Kobayashi, Kawaguchi (JP); Koji Fukui, Machida (JP); Nobuyuki Ichimaru, Yokohama (JP); Yoichi Kumemura, Yokohama (JP); Shuichiro Kuroiwa, Tokyo (JP); Masaaki Uchiyama, Tokyo (JP); Tatsuya Gankai, Yokohama (JP); Ryusuke Hirao, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 636 days.

(21) Appl. No.: 11/655,195

(22) Filed: Jan. 19, 2007

(65) Prior Publication Data
US 2007/0192030 A1    Aug. 16, 2007

(30) Foreign Application Priority Data
Feb. 14, 2006  (JP) ................................ 2006-037073

(51) Int. Cl.
*G08G 1/16*  (2006.01)
(52) U.S. Cl. .............. 701/301; 701/37; 701/48; 701/70; 701/91; 280/5.507; 280/5.512; 280/5.514; 280/5.515; 280/5.519; 180/271

(58) Field of Classification Search ............. 701/301, 701/37, 38, 48, 70, 91; 477/37, 109, 115, 477/906, 98; 180/271, 274, 282; 280/5.5, 280/5.502, 5.507, 5.509, 5.512–5.515, 5.519
See application file for complete search history.

(56) References Cited

U.S. PATENT DOCUMENTS

| 5,418,727 | A | | 5/1995 | Ikeda et al. | |
|---|---|---|---|---|---|
| 5,808,890 | A | * | 9/1998 | Sasaki | 701/37 |
| 6,139,118 | A | * | 10/2000 | Hurst et al. | 303/7 |
| 6,370,461 | B1 | | 4/2002 | Pierce et al. | |
| 6,452,535 | B1 | * | 9/2002 | Rao et al. | 342/72 |
| 6,480,144 | B1 | * | 11/2002 | Miller et al. | 342/72 |
| 7,236,865 | B2 | * | 6/2007 | Prakah-Asante et al. | 701/45 |
| 7,494,153 | B2 | * | 2/2009 | Wang | 280/755 |
| 2003/0060980 | A1 | | 3/2003 | Prakah-Asante et al. | |
| 2003/0225494 | A1 | * | 12/2003 | Coelingh et al. | 701/48 |
| 2005/0065688 | A1 | * | 3/2005 | Rao et al. | 701/45 |
| 2005/0230176 | A1 | * | 10/2005 | Wang | 180/282 |
| 2006/0155469 | A1 | * | 7/2006 | Kawasaki | 701/301 |
| 2007/0168128 | A1 | * | 7/2007 | Tokoro et al. | 701/301 |

(Continued)

FOREIGN PATENT DOCUMENTS
EP    1 369 287 A2    12/2003
(Continued)

OTHER PUBLICATIONS
European Search Report dated Jun. 6, 2007 (five (5) pages).

*Primary Examiner* — Jack Keith
*Assistant Examiner* — Rami Khatib
(74) *Attorney, Agent, or Firm* — Crowell & Moring LLP

(57) ABSTRACT

A collision between a vehicle and an obstacle is estimated, and based on the estimation result, vehicle deceleration control is performed by a brake actuator to reduce the collision and vehicle wheel load is controlled by a suspension actuator.

5 Claims, 21 Drawing Sheets

U.S. PATENT DOCUMENTS

2008/0147277 A1* 6/2008 Lu et al. .................. 701/45
2009/0138201 A1 5/2009 Eckstein et al.

FOREIGN PATENT DOCUMENTS

| | | | |
|---|---|---|---|
| JP | 7-132787 A | | 5/1995 |
| JP | 09249016 A | * | 9/1997 |
| JP | 3467339 B2 | | 8/2003 |
| WO | WO 2005080119 A1 | * | 9/2005 |
| WO | WO 2006/002789 A1 | | 1/2006 |

* cited by examiner

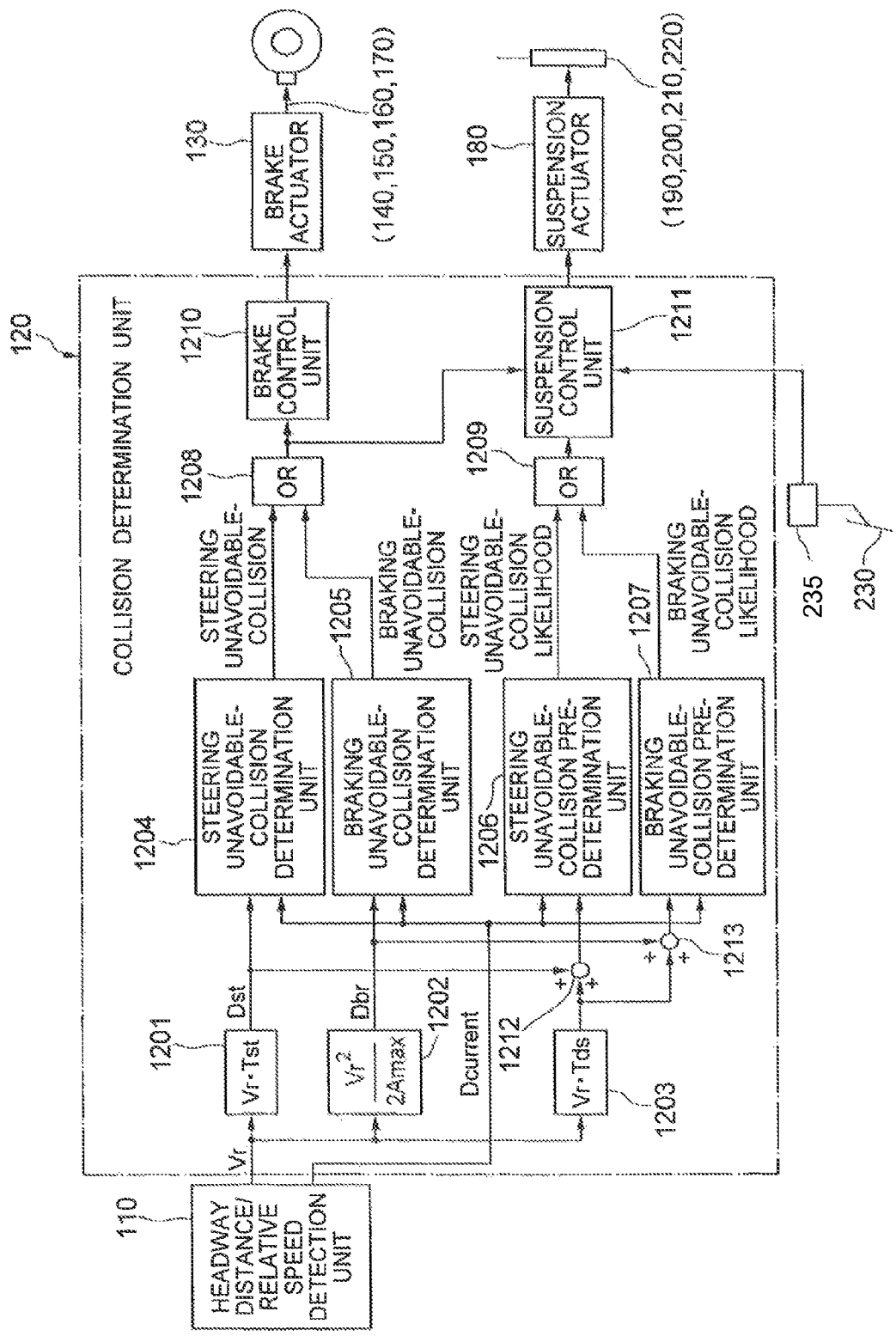

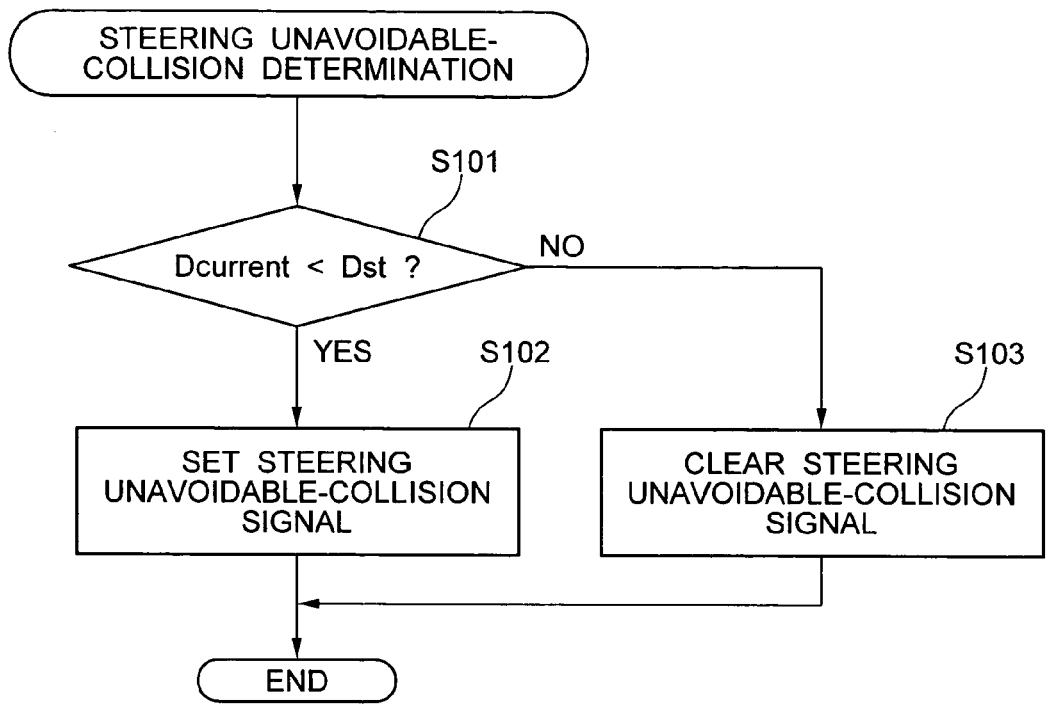
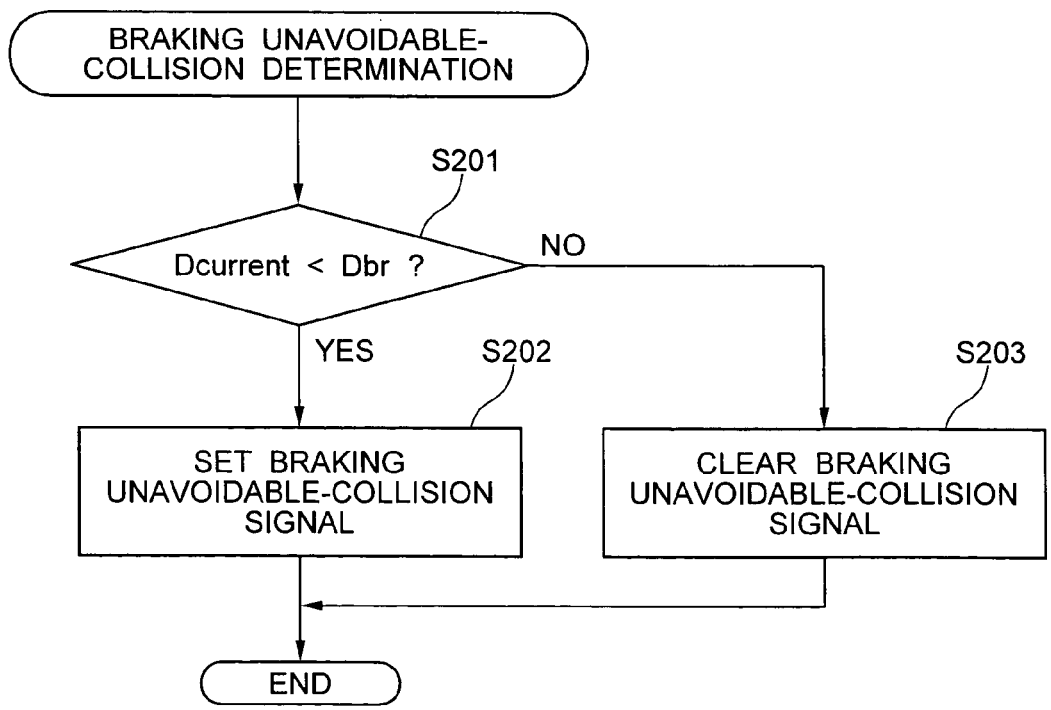

VEHICLE SAFETY CONTROL APPARATUS FOR AVOIDING COLLISION

BACKGROUND OF THE INVENTION

The present invention relates to a vehicle safety control apparatus for avoiding collision, and more particularly to a safety control apparatus for avoiding collision which performs driver assistance (accident avoidance assistance control) in an ASV (Advanced Safety Vehicle).

In recent years, in order to reduce damage upon occurrence of an accident, there have been proposed a collision state control system and a collision avoidance apparatus being a forward obstacle collision reduction control apparatus used in a vehicle such as an automobile, which identifies an obstacle by use of a radar mounted in the vehicle and performs automatic control when the running vehicle is likely to collide with the obstacle (for example, Japanese Patent No. 3467339, JP-A-7-132787).

According to conventional art, there is provided a system which predicts occurrence of a collision based on a rate of distance change between the vehicle and a forward obstacle detected by a range sensor, or which monitors based on signals from a vehicle speed sensor or a range sensor using a radar whether or not a headway distance to the preceding vehicle is kept at a safety distance and thereby predicts occurrence of a collision, or which automatically causes a brake to operate in a stepwise manner when the headway distance is equal to or less than the safety distance.

SUMMARY OF THE INVENTION

In the conventional art collision avoidance apparatuses and the like, deceleration is performed only by applying the brake when a collision is unavoidable, and vehicle braking is not performed in consideration of wheel load. Accordingly, there are limitations to shortening of braking distance when a collision is unavoidable.

The present invention has been achieved in view of the above problem, and has an object to provide a safety control apparatus for avoiding collision which ensures safe application of the brake and at the same time, is capable of shortening braking distance when a collision is unavoidable, as compared to the conventional art and thereby performs safer control for avoiding collision.

To achieve the object, a safety control apparatus for avoiding collision used in a vehicle according to the present invention includes: a headway distance/relative speed detection unit measuring a distance and relative speed between the vehicle and an obstacle; a collision determination unit estimating and determining a collision with the obstacle based on the distance and relative speed measured by the headway distance/relative speed detection unit; a brake actuator controlling a brake to perform deceleration; and a suspension actuator controlling a suspension to vary one of or both a vehicle height and a damping coefficient of a shock absorber, wherein the collision estimation and determination is performed by the collision determination unit, whereby the vehicle deceleration control by applying the brake is performed by the brake actuator to reduce impact upon collision and along with the deceleration control, vehicle wheel load is controlled by the suspension actuator.

In the safety control apparatus for avoiding collision according to the present invention, preferably, prior to the collision estimation and determination by the collision determination unit, collision likelihood determination is performed by the collision determination unit, and when it is determined that a collision is likely, the vehicle wheel load control is initiated by the suspension actuator prior to the deceleration control by the brake actuator.

To achieve the object, a safety control apparatus for avoiding collision used in a vehicle according to the present invention includes: a headway distance/relative speed detection unit measuring a distance and relative speed between the vehicle and an obstacle; a collision determination unit estimating and determining a collision with the obstacle based on the distance and relative speed measured by the headway distance/relative speed detection unit; a brake actuator controlling a brake to perform deceleration; and a suspension actuator controlling a suspension to vary a vehicle height, wherein the collision estimation and determination is performed by the collision determination unit, whereby the vehicle deceleration control by applying the brake is performed by the brake actuator to reduce impact upon collision and along with the deceleration control, vehicle height adjustment control of gradually raising a vehicle height of the vehicle is performed by the suspension actuator.

In the safety control apparatus for avoiding collision according to the present invention, preferably, prior to the collision estimation and determination by the collision determination unit, collision likelihood determination is performed by the collision determination unit, and when it is determined that a collision is likely, a vehicle height is preliminarily lowered and thereafter, there is performed vehicle height adjustment control of gradually raising a vehicle height of the vehicle when the brake is applied based on the collision estimation and determination.

In the safety control apparatus for avoiding collision according to the present invention, preferably, prior to the collision estimation and determination by the collision determination unit, the collision likelihood determination is performed in accordance with a length of time taken to vary a current vehicle height to a lowest vehicle height.

In the safety control apparatus for avoiding collision according to the present invention, preferably, when a brake operation is started by a driver before deceleration control is initiated by the brake actuator based on the collision estimation and determination by the collision determination unit, vehicle height adjustment control of gradually raising a vehicle height is performed starting just after the driver starts the brake operation.

In the safety control apparatus for avoiding collision according to the present invention, preferably, the vehicle height adjustment control of gradually raising a vehicle height by the suspension actuator is performed by a different rate of change of vehicle height in accordance with a suspension position of each wheel.

In the safety control apparatus for avoiding collision according to the present invention, preferably, when the brake is applied based on the collision estimation and determination by the collision determination unit, there is performed vehicle height adjustment control of gradually raising a vehicle height and then changing back the vehicle height into normal around a collision time.

In the safety control apparatus for avoiding collision according to the present invention, preferably, when the brake is applied based on the collision estimation and determination by the collision determination unit, there is performed vehicle height adjustment control of gradually raising a vehicle height and then adjusting the vehicle height to maximum around a collision time.

To achieve the object, a safety control apparatus for avoiding collision used in a vehicle according to the present invention includes: a headway distance/relative speed detection unit measuring a distance and relative speed between the vehicle and an obstacle; a collision determination unit estimating and determining a collision with the obstacle based on the distance and relative speed measured by the headway distance/relative speed detection unit; a brake actuator controlling a brake to perform deceleration; and a suspension actuator controlling a suspension to vary a damping coefficient of a shock absorber, wherein the collision estimation and determination is performed by the collision determination unit, whereby the vehicle deceleration control by applying the brake is performed by the brake actuator to reduce impact upon collision and along with the deceleration control, the control of varying a damping coefficient of the shock absorber is performed by the suspension actuator.

In the safety control apparatus for avoiding collision according to the present invention, preferably, along with the deceleration control, control of setting a damping coefficient of the shock absorber to soft expansion and hard contraction is performed by the suspension actuator.

In the safety control apparatus for avoiding collision according to the present invention, preferably, along with the deceleration control, the following control is performed by the suspension actuator; that is, a damping coefficient of the shock absorber in the front side is set to soft expansion and hard contraction, and a damping coefficient of the shock absorber in the rear side is set to hard expansion and soft contraction.

In the safety control apparatus for avoiding collision according to the present invention, preferably, prior to the collision estimation and determination by the collision determination unit, collision likelihood determination is performed by the collision determination unit, and when it is determined that a collision is likely, control of varying a damping coefficient of the shock absorber is preliminarily performed by the suspension actuator.

According to the safety control apparatus for avoiding collision of the present invention, when deceleration control by applying the brake is performed to reduce impact upon collision, wheel load is controlled by the suspension actuator, so that it is possible to improve tire friction force. As a result, vehicle deceleration can be increased during application of the brake to increase the amount of speed reduction and thus braking distance when a collision is unavoidable can be shortened as compared to conventional art.

Other objects, features and advantages of the invention will become apparent from the following description of the embodiments of the invention taken in conjunction with the accompanying drawings.

BRIEF DESCRIPTION OF THE DRAWING

FIG. 8 is a block diagram illustrating details of a collision determination unit of the safety control apparatus for avoiding collision according to Embodiment 1;

FIG. 9 is a flowchart illustrating a processing flow of steering unavoidable-collision determination performed by the collision determination unit of the safety control apparatus for avoiding collision according to Embodiment 1;

FIG. 10 is a flowchart illustrating a processing flow of braking unavoidable-collision determination performed by the collision determination unit of the safety control apparatus for avoiding collision according to Embodiment 1;

DESCRIPTION OF THE EMBODIMENTS

Embodiments of a vehicle safety control apparatus for avoiding collision according to the present invention will be described with reference to the drawings.

Embodiment 1

Figure 1:
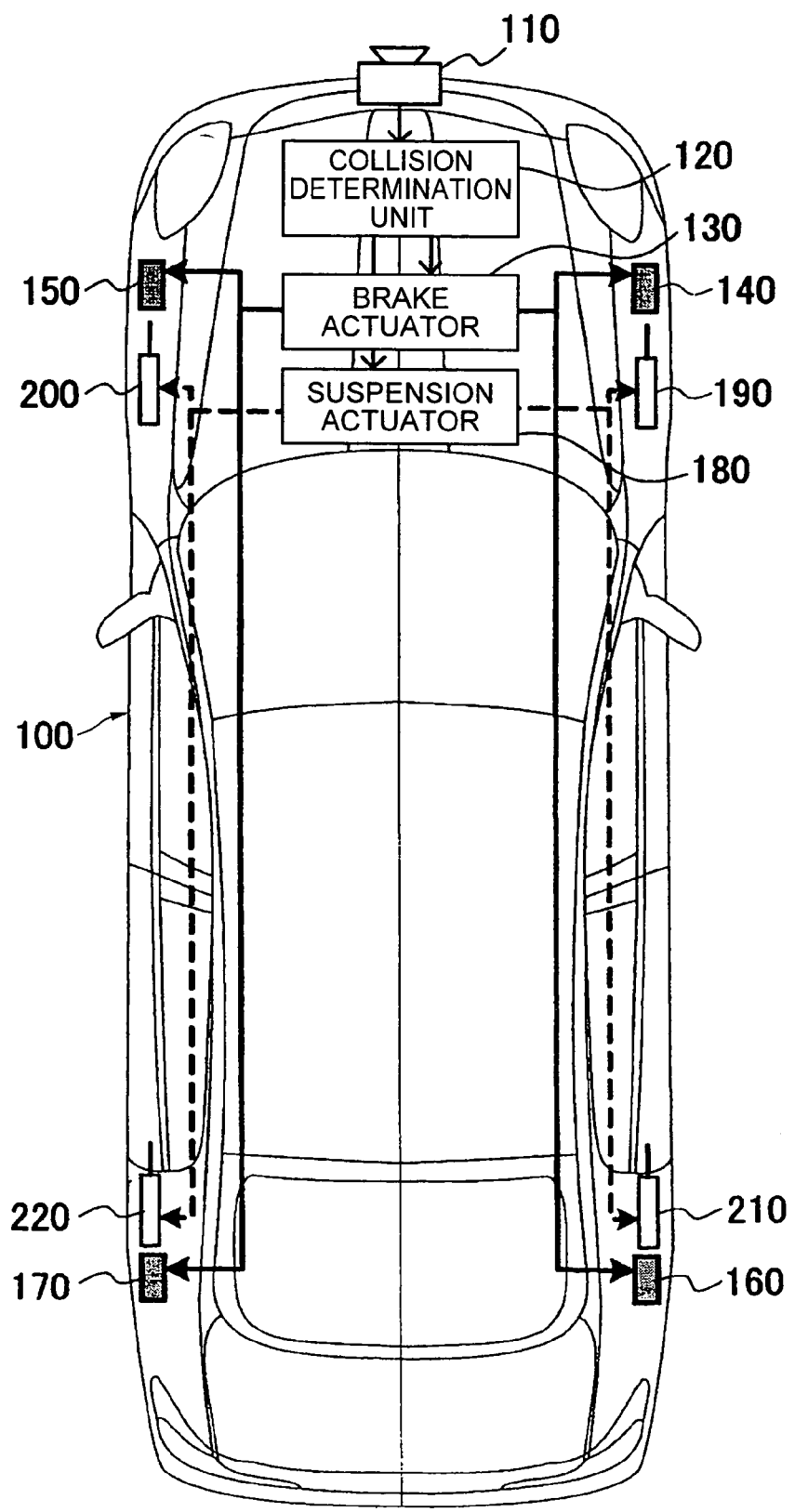
FIG. 1 is a view illustrating a configuration of a vehicle having mounted therein a safety control apparatus for avoiding collision according to Embodiment 1 of the present invention.

FIGS. 1 to 15 illustrate a vehicle safety control apparatus for avoiding collision according to Embodiment 1 of the present invention. FIG. 1 illustrates a configuration of a vehicle having mounted therein the safety control apparatus for avoiding collision according to Embodiment 1.

A vehicle 100 includes: a headway distance/relative speed detection unit 110 using a radar; a collision determination unit 120 determining a collision with the preceding vehicle; a brake actuator 130 controlling brakes 140, 150, 160, 170; and a suspension actuator 180 controlling suspensions 190, 200, 210, 220 capable of adjusting vehicle height.

The brakes 140, 150, 160, 170 are an electrically driven hydraulic type and controlled by the brake actuator 130.

The brake actuator 130 will be described with reference to FIGS. 2 and 3.

Figure 2:
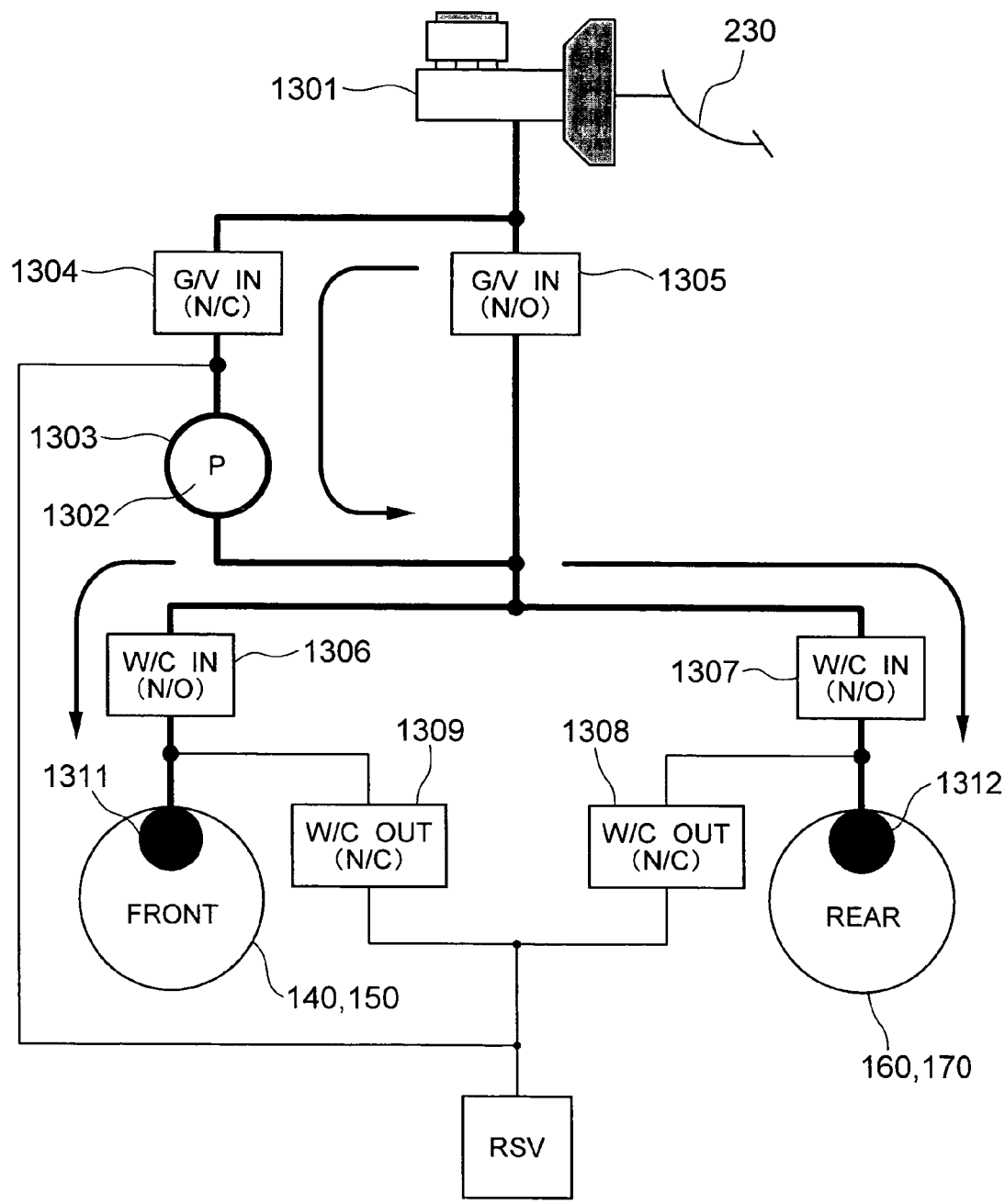
FIG. 2 is a circuit diagram of a brake hydraulic drive unit of a brake actuator of the vehicle having mounted therein the safety control apparatus for avoiding collision according to Embodiment 1.
Figure 3:
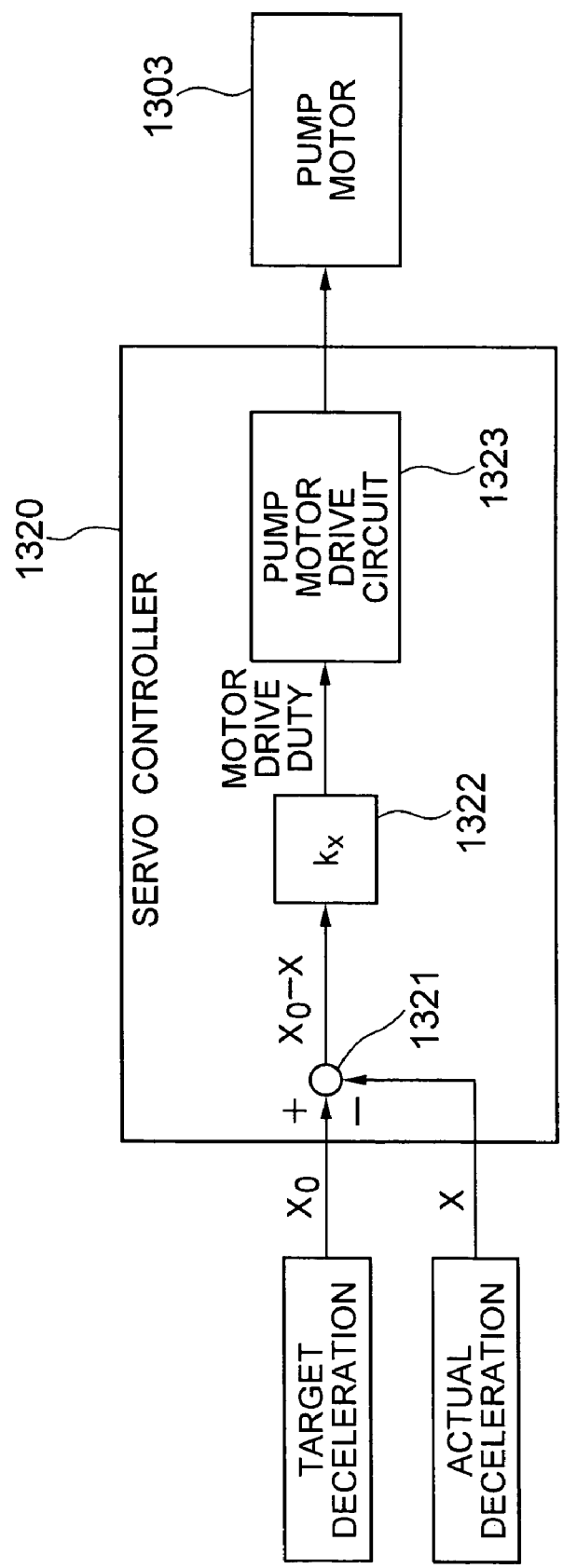
FIG. 3 is a block diagram illustrating a servo control system of the brake actuator of the vehicle having mounted therein the safety control apparatus for avoiding collision according to Embodiment 1.

The brake hydraulic drive unit of the brake actuator 130 is, as illustrated in FIG. 2, constituted of: a master cylinder 1301 manipulated by use of a brake pedal 230; a plunger pump 1302 driven by a pump motor 1303; valves 1304 to 1309 controlling a flow direction of pressure fluid (hereinafter referred to as "pressure oil") discharged from the plunger pump 1302, the pressure fluid flowing into a brake caliper 1311 of front wheel brakes 140, 150 and a brake caliper 1312 of rear wheel brakes 160, 170.

The hydraulic circuit is constituted of dual-circuit brake system, which correspond to X-pipe arrangement. Accordingly, FL wheel and RR wheel are connected to the primary system; and FR wheel and RL wheel are connected to the secondary system. With respect to the valves 1304 to 1309, G/V OUT and W/C IN are N/O; and G/V IN and W/C OUT are N/C.

When the brake is applied (deceleration), the valve 1304 is changed to an open state, the valve 1305 is changed to a closed state (holding current is controlled according to fluid pressure), the valves 1306, 1307 are changed to an open state, the valves 1308, 1309 are changed to a closed state, and the pump motor 1303 is turned on (pressure increasing gradient is controlled by motor revolution speed), whereby pressure oil residing in the master cylinder 1301 is made to flow into the brake caliper 1311 to increase actual brake fluid pressure.

The pump motor 1303 is controlled according to a target deceleration. Accordingly, deceleration of the vehicle 100 by braking operation of the brakes 140 to 170 is variably set. FIG. 3 illustrates a servo control system of the pump motor 1303. A servo controller 1320 of the pump motor 1303 includes: an arithmetic unit 1321 calculating a difference between a target deceleration Xo and an actual deceleration X of the vehicle 100; a gain setting unit 1322; and a pump motor drive circuit 1323.

The servo controller 1320 multiplies a difference between target deceleration Xo and actual deceleration X of the vehicle 100 by a gain Kx and thereby determines a duty ratio of voltage waveform to be applied to the pump motor 1303, and causes the pump motor drive circuit 1323 to supply to the pump motor 1303 a voltage waveform having the duty ratio.

Using the above described brake actuator 130, brake control of adjusting actual deceleration X of the vehicle 100 to target deceleration Xo is performed.

The brakes 140, 150, 160, 170 are not limited to an electrically driven hydraulic type, and may be an electrically driven type brake.

The suspensions 190, 200, 210, 220 are a suspension capable of adjusting vehicle height and controlled by the suspension actuator 180.

The suspension actuator 180 will now be described with reference to FIGS. 4 to 7.

Figure 4:
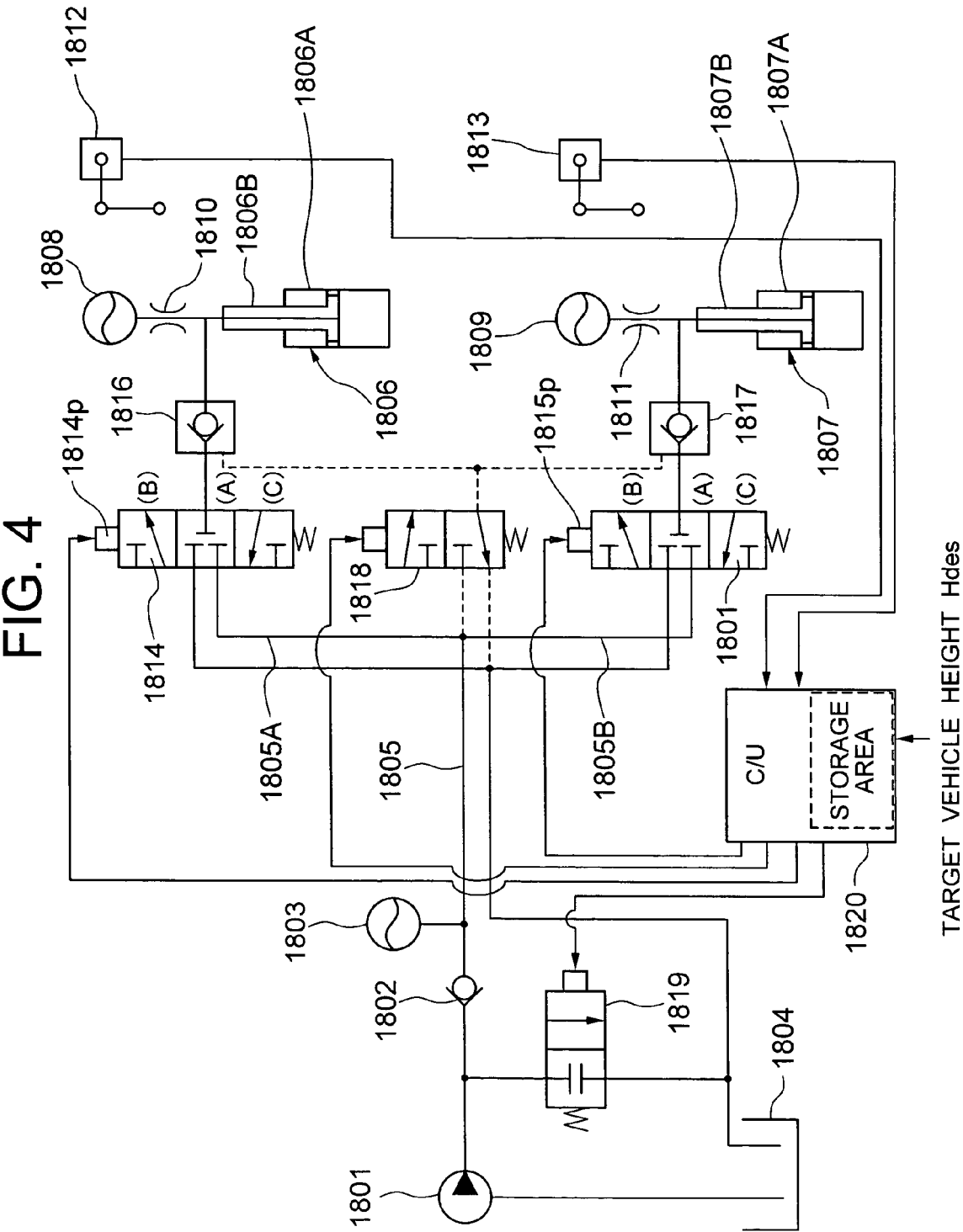
FIG. 4 is a circuit diagram of a suspension actuator of the vehicle having mounted therein the safety control apparatus for avoiding collision according to Embodiment 1.
Figure 5:
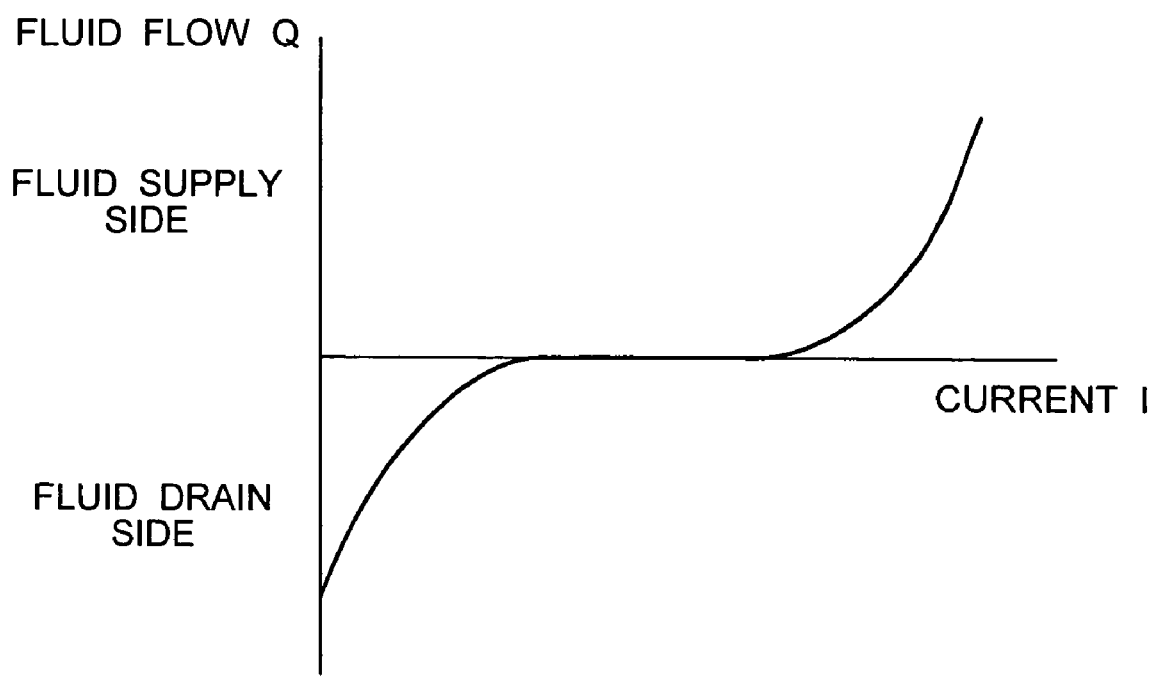
FIG. 5 is a view illustrating flux-current characteristics of a supply/drain valve used in the suspension actuator of the vehicle having mounted therein the safety control apparatus for avoiding collision according to Embodiment 1.

As illustrated in FIG. 4, the suspension actuator 180 acting as a pressure oil supplying unit includes: an hydraulic pump 1801 driven by a vehicle-mounted engine; a check valve 1802 preventing pressure fluid (hereinafter referred to as "pressure oil") discharged from the hydraulic pump 1801 from flowing back to the hydraulic pump 1801 side; an accumulator 1803 pooling pressure oil discharged from the hydraulic pump 1801; a pressure detection unit (not illustrated) detecting a pressure of the interior of the accumulator 1803; and an unload valve 1819 using an electromagnetic switching valve arranged between the discharge side of the hydraulic pump 1801 and a reserver tank 1804.

Pressure oil discharged from the hydraulic pump 1801 is reserved in the accumulator 1803; and when the pressure detection unit detects a predetermined pressure, the unload valve 1819 is controlled to return the pressure oil discharged from the hydraulic pump 1801 to the reserve tank 1804. Accordingly, the pressure of pressure oil residing in the accumulator 1803 is kept at a predetermined value.

A tip end of a common pipe 1805 connected to the accumulator 1803 branches out into four branching pipes 1805A, 1805B, (only two pipes being illustrated), for example; and tip ends of each said branching pipes 1805A, 1805B, . . . are connected to hydraulic cylinders 1806, 1807 and the like.

The hydraulic cylinders 1806, 1807 are a hydraulic cylinder (only the front left/right wheel side being illustrated) acting as a vehicle height adjustment unit arranged between the vehicle body side of the vehicle 100 and the axle side of each wheel. The hydraulic cylinders 1806, 1807 constitute suspensions which suspend the vehicle body in the front left/right wheel side; when pressure oil from the hydraulic pump 1801 is supplied and drained, rods 1806B, 1807B are made to expand and contract from tubes 1806A, 1807A, whereby vehicle height adjustment or attitude control etc. of the vehicle body are performed.

In FIG. 4, the hydraulic cylinders 1806, 1807 arranged in the front left/right side are illustrated, but similar hydraulic cylinders (not illustrated) are also arranged in the rear left/right side and these hydraulic cylinders are also connected to branching pipes similar to the branching pipes 1805A, 1805B.

The hydraulic cylinders 1806, 1807 are provided with accumulators 1808, 1809. The accumulators 1808, 1809 are connected via damping force valves (orifices) 1810, 1811 to the hydraulic cylinders 1806, 1807 and operates as a gas spring which urges the rods 1806B, 1807B of the hydraulic cylinders 1806, 1807 in an expanding direction at all times. When the rods 1806B, 1807B of the hydraulic cylinders 1806, 1807 expand and contract due to a vibration from the outside, pressure oil circulates between the hydraulic cylinders 1806, 1807 and the accumulators 1808, 1809; at this time, a damping force is generated by damping force valves 1810, 1811 to absorb the vibration.

Vehicle height sensors 1812, 1813 are arranged in the front left/right wheel side. The vehicle height sensors 1812, 1813 detects a height position of the vehicle body side relative to the axle side in the front wheel side of the vehicle and then outputs respective detected signals to a control unit 1820.

In the middle of each branching pipe 1805A, 1805B, there are arranged supply/drain valves 1814, 1815 and pilot operation check valves 1816, 1817.

The supply/drain valves 1814, 1815 are constituted of an electromagnetic proportional control valve having three ports and three positions provided with a solenoid 1814p, 1815p. When power is supplied to the solenoid 1814p, 1815p by use of a control signal from the control unit 1820, the supply/drain valves 1814, 1815 are changed according to fluid flow-electric current characteristics illustrated in FIG. 5, to valve closing position (A) or pressure oil supplying position (B) or pressure oil draining position (C) to thereby control supplying and draining of pressure oil with respect to the hydraulic cylinders 1806, 1807.

When power is not supplied to the solenoids 1814p, 1815p, the supply/drain valves 1814, 1815 are held at pressure oil draining position (C), and pressure oil is drained from the hydraulic cylinders 1806, 1807 to the reserver tank 1804.

The pilot operation check valves 1816, 1817 are controlled by a pilot control valve 1818 constituted of an electromagnetic switching valve having three ports and two positions, and serves to prevent pressure oil from being drained when power is not supplied to the solenoids 1814p, 1815p.

The pilot operation check valves 1816, 1817 opens upon a pilot pressure being applied by the pilot control valve 1818 and causes the hydraulic cylinders 1806, 1807 to communicate with the pressure supply source, and upon the pilot pressure being not applied, functions as an ordinary check valve and permits only pressure oil flow from the pressure supply source to the hydraulic cylinders 1806, 1807.

The control unit 1820 is constituted of a microcomputer etc.; the input side thereof is connected to the vehicle height sensors 1812, 1813, a vehicle speed sensor, a steering sensor (not illustrated) and the like; the output side thereof is connected to the drain valve 1819, the supply/drain valves 1814, 1815, the pilot control valve 1818 and the like. The control unit 1820 stores in its storage circuit a program etc. of a processing flow illustrated in FIG. 6 and performs a vehicle height adjustment control processing and the like. In the storage circuit of the control unit 1820, its storage area 1820A stores reference data etc. for vehicle height determination.

Figure 6:
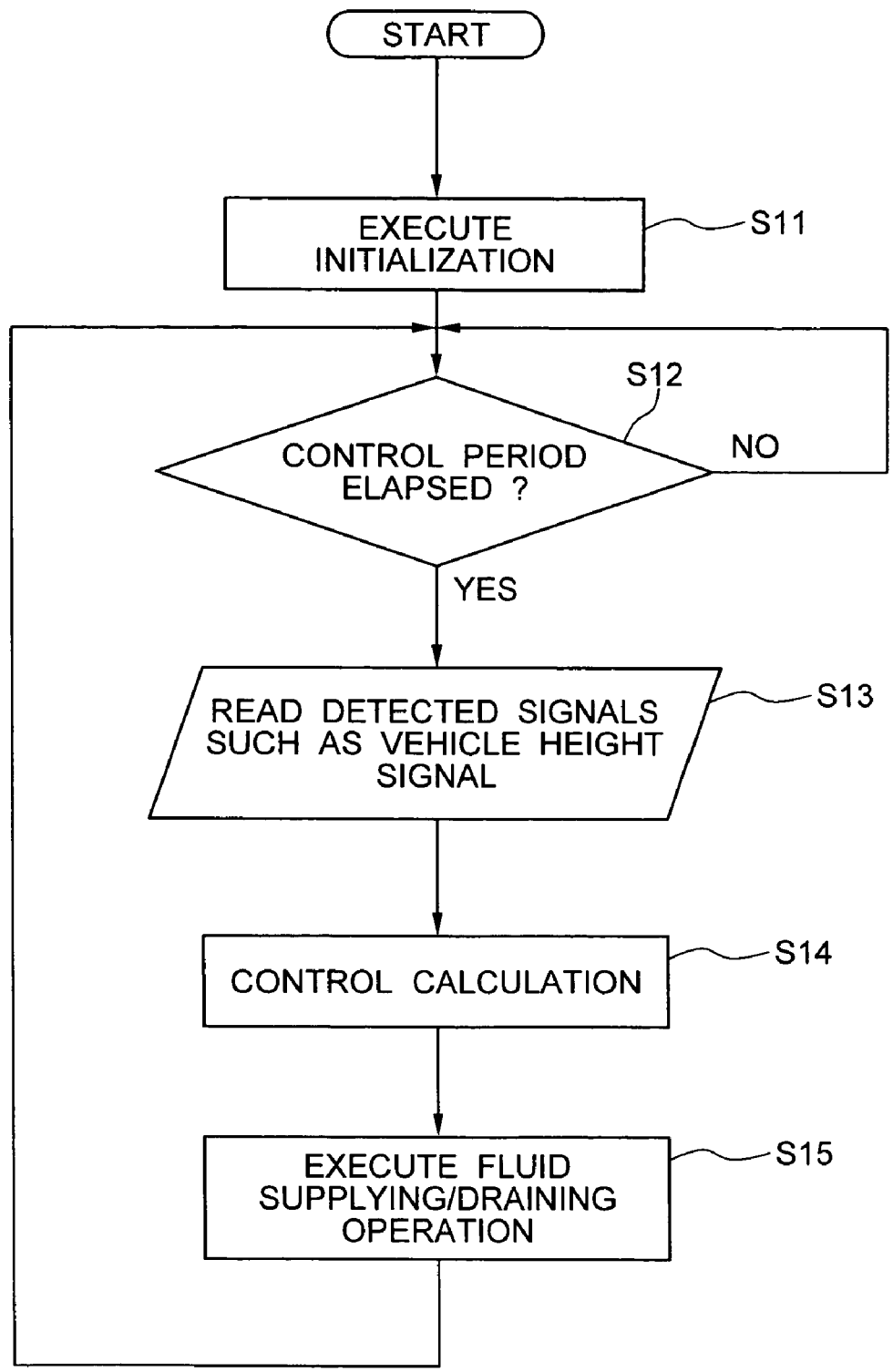
FIG. 6 is a flowchart illustrating a vehicle height adjustment control processing flow performed by the suspension actuator of the vehicle having mounted therein the safety control apparatus for avoiding collision according to Embodiment 1.

The vehicle height adjustment control processing by the control unit 1820 will be described with reference to a flowchart illustrated in FIG. 6.

First, when a power supply switch (not illustrated) is turned on, the processing operation starts and then various setting values etc. and outputs signals are initialized (step S11). Here, a signal indicating the valve closing position (A) is outputted to the supply/drain valves 1814, 1815 and subsequently a signal of applying a pilot pressure is outputted to the pilot control valve 1818 to open the pilot operation check valves 1816, 1817, whereby the hydraulic cylinders 1806, 1807 are made to communicate with the pressure supply source.

Subsequently, it is determined whether a control period of about several milliseconds has elapsed. When it is determined "YES", detected signals are read from the vehicle height sensors 1812, 1813 and the like. Subsequently, control calculation for vehicle height control etc. is performed (step S14), and a current I is outputted to the solenoids 1814p, 1815p of the supply/drain valves 1814, 1815 to execute a fluid supplying/draining operation (step S15).

Figure 7:
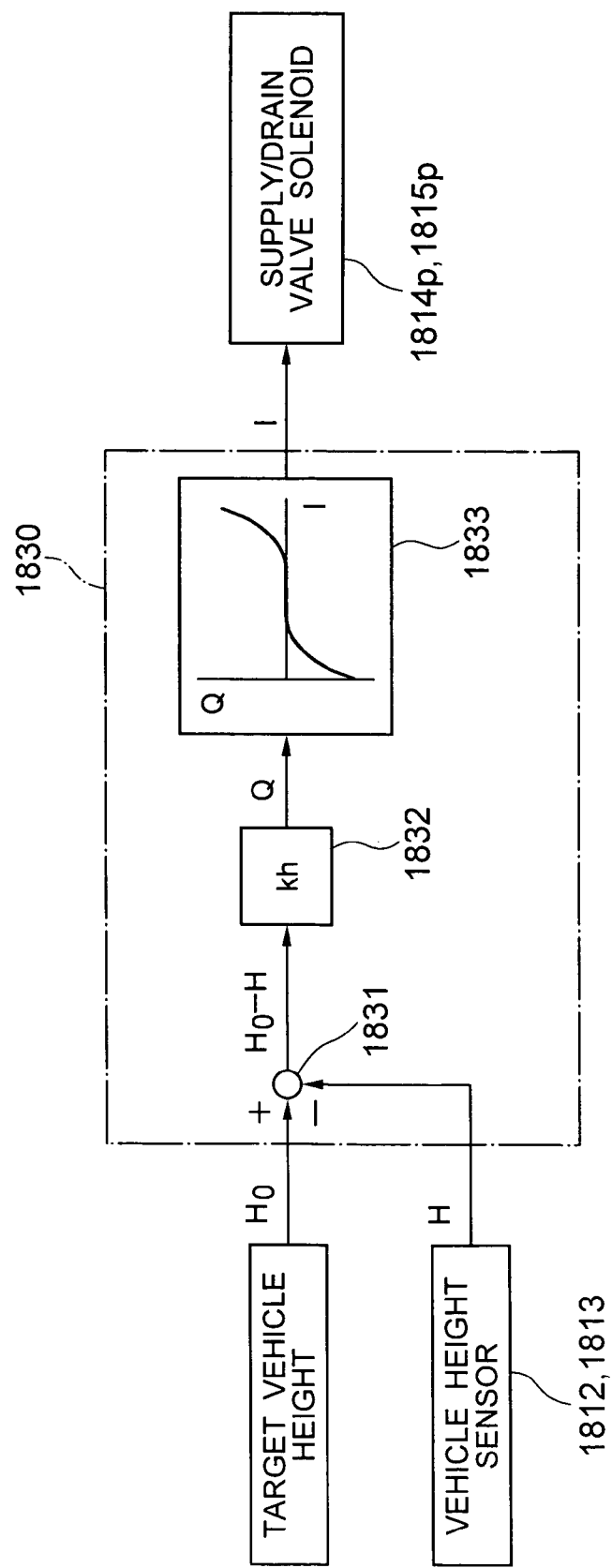
FIG. 7 is a block diagram illustrating a servo control system of the suspension actuator of the vehicle having mounted therein the safety control apparatus for avoiding collision according to Embodiment 1.

A case where the vehicle height control calculation is performed by a servo controller 1830 will be described with reference to FIG. 7. The servo controller 1830 includes: a calculation unit 1831 calculating a difference between a target vehicle height Ho and a vehicle height (actual vehicle height) H detected by the vehicle height sensors 1812, 1813; a gain setting unit 1832; and a solenoid drive circuit 1833.

The servo controller 1830 multiplies a difference between target vehicle height Ho and vehicle height H detected by the vehicle height sensors 1812, 1813 by a gain Kh to thereby determine a flux Q and determines a duty ratio of voltage waveform to be applied to the pump motor 1303, and then determines from a data table 1224 of the solenoid drive circuit 1833, a current I of the solenoids 1814p, 1815p corresponding to flux Q, thereby controlling supplying of current I to the solenoids 1814p, 1815p.

Using the above described suspension actuator 180, suspension control of adjusting actual vehicle height H to target vehicle height Ho is performed.

The headway distance/relative speed detection unit 110 includes a range sensor using a radar and has a function of measuring a headway distance Dcurrent to the preceding vehicle and a function of measuring a relative speed Vr to the preceding vehicle based on a temporal change of headway distance Dcurrent. The headway distance Dcurrent and relative speed Vr are sent to the collision determination unit 120.

The collision determination unit 120 determines based on headway distance Dcurrent and relative speed Vr sent from the headway distance/relative speed detection unit 110 whether the self vehicle is to collide with the preceding vehicle, and shortly before the collision determination is performed, collision pre-determination is performed. Based on the collision pre-determination, a target vehicle height is sent to the suspension actuator 180; and based on the collision determination, a target deceleration is sent to the brake actuator 130.

Details of the collision determination unit 120 will be described below with reference to FIG. 8. The collision determination unit 120 is an electronically controlled controller using a microcomputer etc. and includes a steering avoidable-collision threshold distance calculation unit 1201, a braking avoidable-collision threshold distance calculation unit 1202, a collision pre-determination margin distance calculation unit 1203, a steering unavoidable-collision determination unit 1204, a braking unavoidable-collision determination unit 1205, a steering unavoidable-collision pre-determination unit 1206, a braking unavoidable-collision pre-determination unit 1207, OR gates 1208, 1209, a brake control unit 1210 and a suspension control unit 1211.

The steering avoidable-collision threshold distance calculation unit 1201 calculates a steering avoidable-collision threshold distance Dst by the following formula (1).

$$Dst = Vr \cdot Tst \quad (1)$$

That is, relative speed Vr to the preceding vehicle received from the headway distance/relative speed detection unit 110 is multiplied by a steering avoidable-collision threshold time Tst to determine steering avoidable-collision threshold distance Dst.

Steering avoidable-collision threshold time Tst is a minimum time for allowing the driver to avoid the preceding vehicle 100 by steering operation and is set to a proper value as a parameter. When headway distance Dcurrent to the preceding vehicle becomes smaller than steering avoidable-collision threshold distance Dst, the driver cannot avoid a collision with the preceding vehicle by steering operation.

The braking avoidable-collision threshold distance calculation unit 1202 calculates a braking avoidable-collision threshold distance Dbr by the following formula (2).

$$Dbr = Vr^2/2A\max \quad (2)$$

Formula (2) is for calculating a headway distance to the preceding vehicle shortened by the time that relative speed Vr to the preceding vehicle changes to 0 when the self vehicle is decelerated at a maximum deceleration Amax. When headway distance Dcurrent to the preceding vehicle becomes smaller than braking avoidable-collision threshold distance Dbr, the driver cannot avoid a collision with the preceding vehicle by braking operation.

The steering unavoidable-collision determination unit 1204 executes a processing flow illustrated in FIG. 9; that is, the unit 1204 receives headway distance Dcurrent from the headway distance/relative speed detection unit 110 and receives steering avoidable-collision threshold distance Dst from the steering avoidable-collision threshold distance calculation unit 1201, and then determines whether headway distance Dcurrent to the preceding vehicle is smaller than steering avoidable-collision threshold distance Dst (step S101). If headway distance Dcurrent to the preceding vehicle is smaller than steering avoidable-collision threshold distance Dst, a steering unavoidable-collision signal is outputted (set) (step S102); if not, the steering unavoidable-collision signal is cleared (step S103).

The braking unavoidable-collision determination unit 1205 executes a processing flow illustrated in FIG. 10; that is, the unit 1205 receives headway distance Dcurrent from the headway distance/relative speed detection unit 110 and receives braking avoidable-collision threshold distance Dbs from the braking avoidable-collision threshold distance calculation unit 1202, and then determines whether headway distance Dcurrent to the preceding vehicle is smaller than braking avoidable-collision threshold distance Dbr (step S201). If headway distance Dcurrent to the preceding vehicle is smaller than braking avoidable-collision threshold distance Dbr, a braking unavoidable-collision signal is outputted (set) (step S202); if not, the braking unavoidable-collision signal is cleared (step S203).

The steering unavoidable-collision signal and braking unavoidable-collision signal are supplied to the OR gate 1208, and then the OR gate 1208 outputs a logic result signal to the brake control unit 1210.

Accordingly, when at least one of the steering unavoidable-collision signal and braking unavoidable-collision signal is set, the brake control unit 1210 outputs a brake drive signal to the brake actuator 130. When receiving the brake drive signal, the brake actuator 130 is activated and thus braking operations by the brakes 140 to 170 are initiated.

The collision pre-determination margin distance calculation unit 1203 calculates a collision pre-determination margin distance Dds by the following formula (3).

$$Dds = Vr \cdot Tds \quad (3)$$

That is, relative speed Vr to the preceding vehicle received from the headway distance/relative speed detection unit 110 is multiplied by a collision pre-determination margin time Tds to calculate collision pre-determination margin distance Dds. Collision pre-determination margin distance Dds is a headway distance between the self vehicle and preceding vehicle which varies during a length of time taken for shock absorber control to be prepared after collision determination.

Collision pre-determination margin time Tds is a length of time taken for the suspension actuator 180 to lower the vehicle height from a current vehicle height Hcurrent to a lowest vehicle height (target vehicle height lower limit) Hmin, being calculated by the following formula (4).

$$Tds = (Hcurrent - Hmin)/Vhm \quad (4)$$

where Vhm: speed of varying vehicle height

Figure 11:
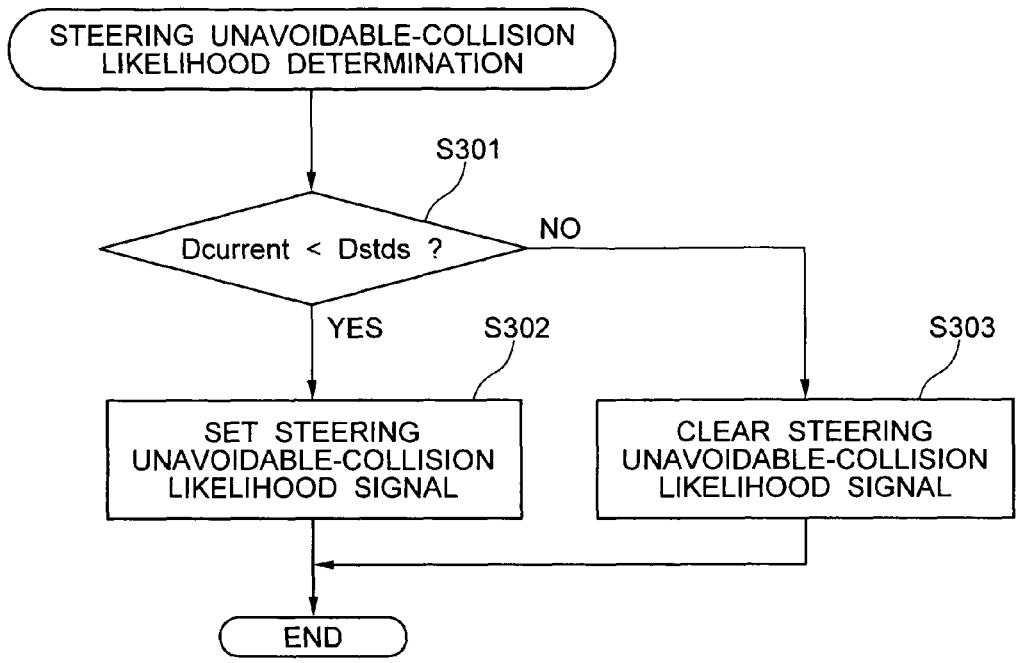
FIG. 11 is a flowchart illustrating a processing flow of steering unavoidable-collision likelihood determination performed by the collision determination unit of the safety control apparatus for avoiding collision according to Embodiment 1.

The steering unavoidable-collision pre-determination unit 1206 is for performing collision likelihood determination prior to collision estimation and determination and executes a processing flow illustrated in FIG. 11; the unit 1206 receives a headway distance Dcurrent from the headway distance/relative speed detection unit 110, and receives from an adder 1212 a steering unavoidable-collision likelihood distance Dstds obtained by adding a collision pre-determination margin distance Dds to a steering avoidable-collision threshold distance Dst, and then determined whether headway distance Dcurrent to the preceding vehicle is smaller than steering unavoidable-collision likelihood distance Dstds (step S301). If headway distance Dcurrent to the preceding vehicle is smaller than steering unavoidable-collision likelihood distance Dstds, a steering unavoidable-collision likelihood signal is outputted (set) (step S302); if not, the steering unavoidable-collision likelihood signal is cleared (step S303).

Figure 12:
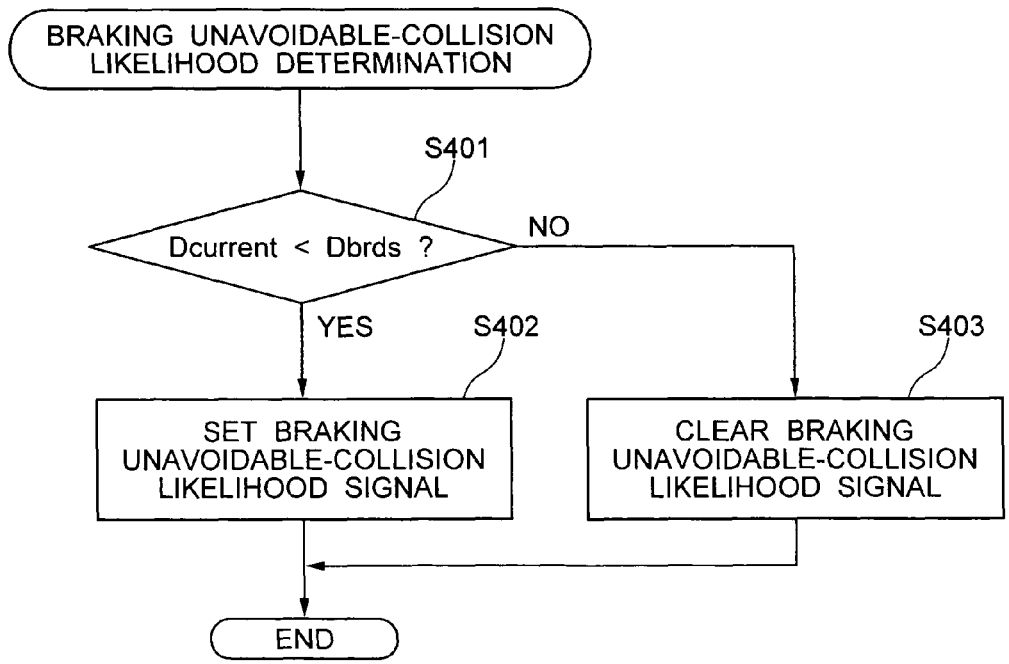
FIG. 12 is a flowchart illustrating a processing flow of braking unavoidable-collision likelihood determination performed by the collision determination unit of the safety control apparatus for avoiding collision according to Embodiment 1.

The braking unavoidable-collision pre-determination unit 1207 is for performing collision likelihood determination prior to collision estimation and determination and executes a processing flow illustrated in FIG. 12; the unit 1207 receives a headway distance Dcurrent from the headway distance/relative speed detection unit 110, and receives from an adder 1213 a braking unavoidable-collision likelihood distance Dstds obtained by adding a collision pre-determination margin distance Dds to a braking avoidable-collision threshold distance Dbr, and then determined whether headway distance Dcurrent to the preceding vehicle is smaller than braking unavoidable-collision likelihood distance Dbrds (step S401). If headway distance Dcurrent to the preceding vehicle is smaller than braking unavoidable-collision likelihood distance Dbrds, a braking unavoidable-collision likelihood signal is outputted (set) (step S402); if not, the braking unavoidable-collision likelihood signal is cleared (step S403).

The steering unavoidable-collision likelihood signal and braking unavoidable-collision likelihood signal are supplied to the OR gate 1209, and then the OR gate 1209 outputs a logic result signal to the suspension control unit 1211.

The suspension control unit 1211 receives a signal from the OR gates 1208, 1209 and receives driver brake operation information from a driver brake operation detection unit 235 detecting pushing of the brake pedal 230 by the driver.

Figure 13:
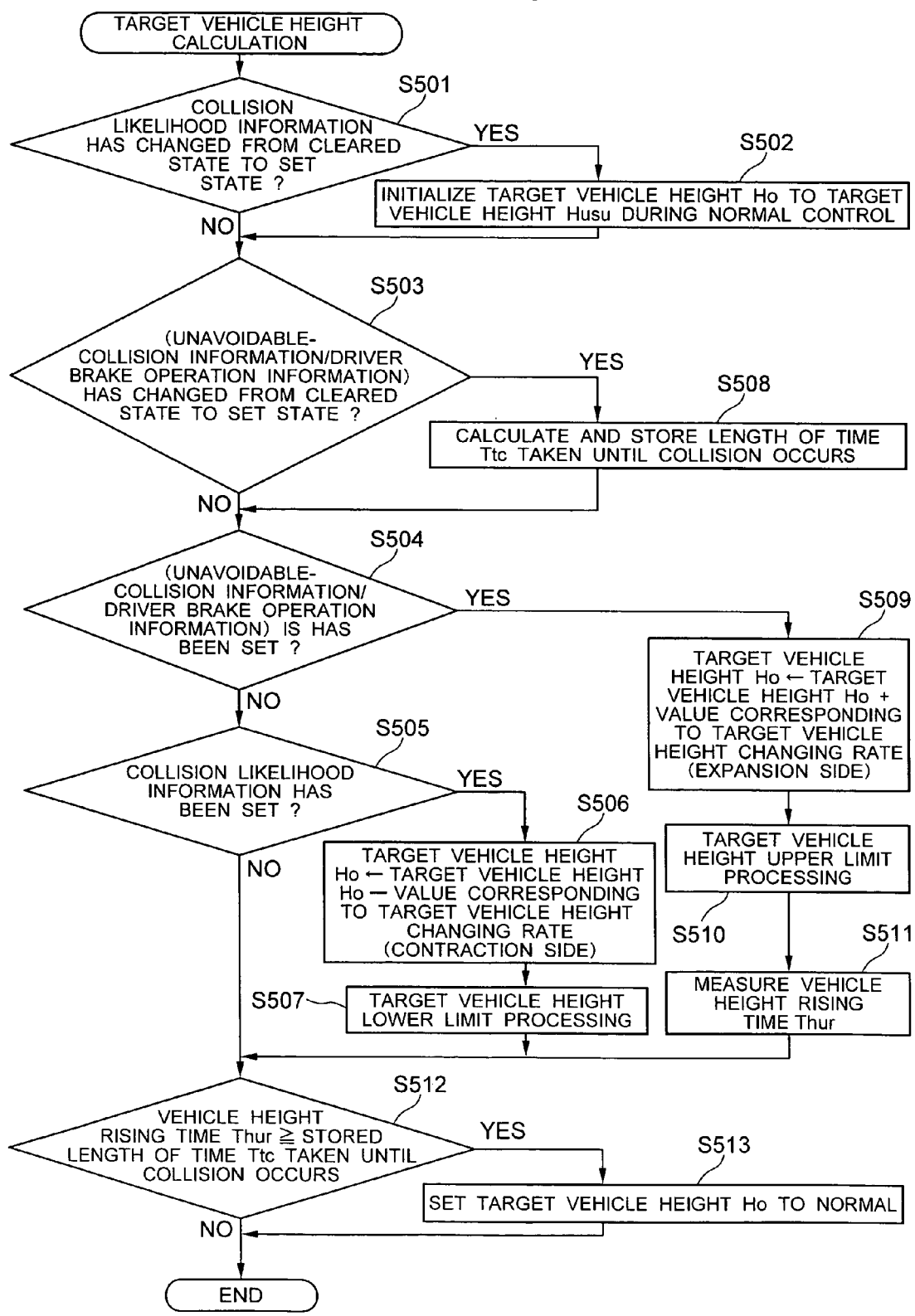
FIG. 13 is a flowchart illustrating an example of target vehicle height calculation of a suspension control unit in the safety control apparatus for avoiding collision according to Embodiment 1.
Figure 14:
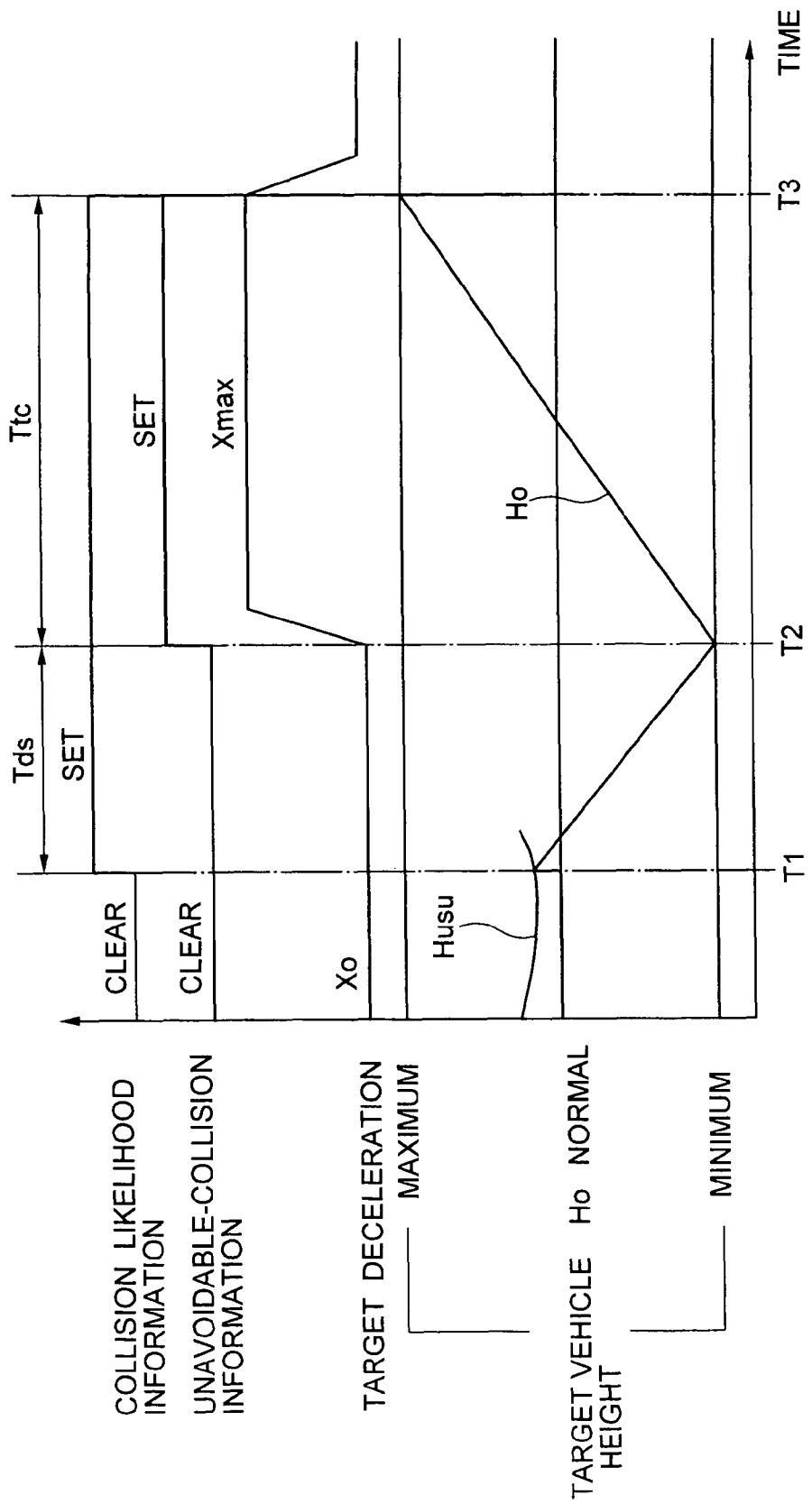
FIG. 14 is a time chart illustrating an example of target vehicle height calculation of a suspension control unit in the safety control apparatus for avoiding collision according to Embodiment 1.

The operation of the suspension control unit 1211 according to the present embodiment 1 will be described with reference to a flowchart of illustrated in FIG. 13 and a time chart illustrated in FIG. 14. In FIG. 13, steering unavoidable-collision signal and braking unavoidable-collision signal are collectively referred to as "unavoidable-collision information"; steering unavoidable-collision likelihood signal and braking unavoidable-collision likelihood signal are collectively referred to as "collision likelihood information".

First, it is determined whether collision likelihood information has changed from a cleared state to a set state (step S510). If it is determined that collision likelihood information has changed from a cleared state to a set state (time T1), target vehicle height Ho is initialized to target vehicle height Husu used when normal control is performed.

Subsequently, If it is determined that unavoidable-collision information and brake driver operation information have not changed from a cleared state to a set state ("NO" in step S503), and at the same time if it is determined that unavoidable-collision information and brake driver operation information have not been set ("NO" in step S504), and at the same time if it is determined that collision likelihood information has been set ("YES" in step S505), then target vehicle height Ho is reduced by a target vehicle height changing rate (contraction side) Hdush (step S506). Target vehicle height changing rate (contraction side) Hdush is a variation in vehicle height which can be achieved per one control period.

A length of time from time T1 when collision likelihood information is set to T2 when unavoidable-collision information is set, i.e., collision pre-determination margin time Tds is a length of time taken to lower by target vehicle height changing rate (contraction side) Hdush, current vehicle height Hcurrent to lowest vehicle height Hmin. Accordingly, after collision likelihood information has been set, vehicle height can be changed approximately to a minimum before time T2 when unavoidable-collision information is set is reached. Subsequently, a lower limit processing is performed so as not for target vehicle height Ho to become equal or less than a lower limit (step S507).

At time T2, when unavoidable-collision information or driver brake operation information changes from a cleared state to a set state ("YES" in step S503), a length of time Ttc from T2 to the time of collision is calculated by the following formula (5) and stored (step S508).

$$Ttc = Dcurrent/Vr \qquad (5)$$

If it is determined that unavoidable-collision information or driver brake operation information has been set ("YES" in step S504), then target vehicle height Ho is increased by a target vehicle height changing rate (expanding side) Hduex (step S509).

Target vehicle height changing rate (expansion side) Hduex is calculated by the following, formula (6).

$$Hduex = (Hmax - Hmin)/Ttc \qquad (6)$$

where Hmax: target vehicle height upper limit, Hmin: target vehicle height lower limit, Ttc: a length of time taken until a collision occurs.

Subsequently, an upper limit processing is performed so that target vehicle height Ho becomes equal to or more than an upper limit (step S510).

Then, vehicle height rising time Thup being a length of time that has elapsed since target vehicle height Ho began to rise, is measured, for example, by advancing a counter starting just after target vehicle height Ho begins to rise (step S511). Then, it is determined whether vehicle height rising time Thup has exceeded the length of time Ttc taken until a collision occurs (step S512). If not, this routine is repeated.

If vehicle height raising time Thup reaches or exceeds the length of time Ttc taken until a collision occurs, target vehicle height Ho is changed back to normal vehicle height Hst at that time (time T3).

Figure 15:
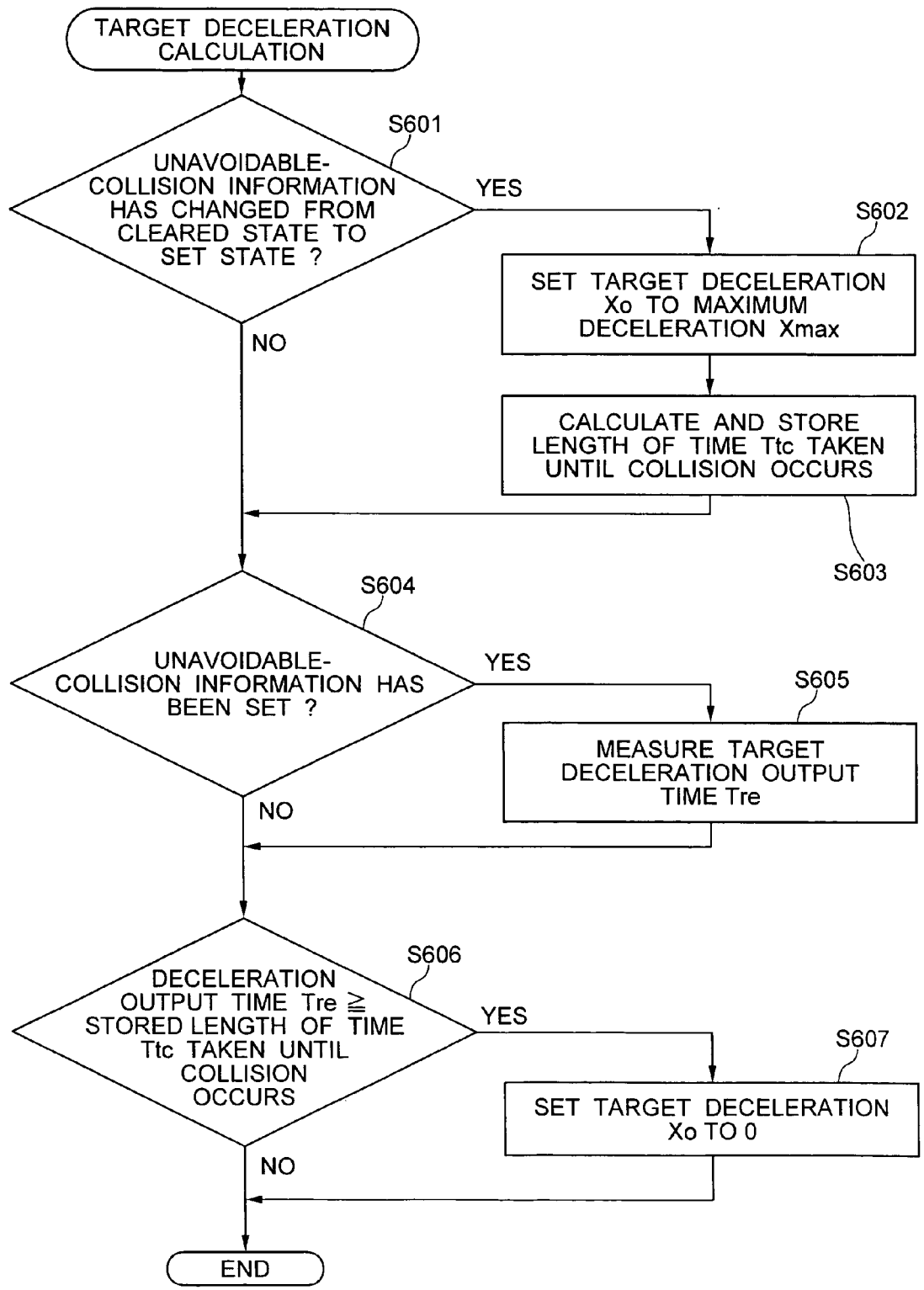
FIG. 15 is a flowchart illustrating a processing flow of target deceleration calculation of a brake control unit in the safety control apparatus for avoiding collision according to Embodiment 1.

The operation of the brake control unit 1210 will be described with reference to a flowchart of illustrated in FIG. 15 and a time chart illustrated in FIG. 14. In FIG. 15, also, steering unavoidable-collision signal and braking unavoidable-collision signal are collectively referred to as "unavoidable-collision information".

First, it is determined whether unavoidable-collision information has changed from a cleared state to a set state (step S601). If it is determined that unavoidable-collision information has changed from a cleared state to a set state (time T2), target deceleration Xo is set to a maximum deceleration Xmax (step S602), a length of time Ttc from time T2 to when a collision occurs is calculated and stored. The calculation of length of time Ttc taken until a collision occurs is identical to that performed by formula (5) in the suspension control unit 1211; thus, if this calculation has been performed in the suspension control unit 1211, that calculation result is used.

Maximum deceleration Xmax is a maximum deceleration by which the vehicle 100 provided with the present apparatus can decelerate safely and efficiently, so when target deceleration Xo is set to maximum deceleration Xmax, automatic braking is applied by the brake actuator 130 and thus the vehicle 100 decelerates at maximum deceleration Xmax.

Subsequently, it is determined whether unavoidable-collision information has been set (step S604); if so, target deceleration output time Tre being a length of time that has elapsed since a time (time T2) when target deceleration Xo was set to maximum deceleration Xmax, is measured, for example, by advancing a counter (step S605).

Then, it is determined whether target deceleration output time Tre has exceeded the length of time Ttc taken until a collision occurs (step S606); if target deceleration output time Tre has reached or exceeded the length of time Ttc taken until a collision occurs, target deceleration Xo is set to 0 at that time (time T3) (step S607). Accordingly, the automatic braking is released.

As described above, the vehicle is decelerated by the automatic braking operation starting just after time T2, and target vehicle height changing rate (expanding side) Hduex is set as described above, whereby it is possible to continue to raise the vehicle height during a time period between time T2 when braking is started (deceleration is started) to a time when a collision occurs (time Ttc taken until a collision occurs). As the vehicle height is raised, the wheel load of the vehicle 100 increases.

Accordingly, during braking (during braking operation), i.e., during a time between time T2 and T3 (length of time Ttc taken until a collision occurs), the wheel load increases, and the friction force of tire under braking with respect to road surface increases accordingly, thus improving braking effect and achieving a high deceleration. As a result, braking distance can be shortened; and vehicle speed at the time of collision is further lowered; collision impact is further reduced.

In addition to when automatic braking is performed by the collision determination unit 120, when the driver pushes the brake pedal 230 to perform the driver brake operation, also, this effect can be achieved similarly and thus the brake performance is raised.

Also, during collision pre-determination margin time Tds, vehicle height is lowered prior to a start of deceleration. Thus, during a length of time Ttc taken until a collision occurs, the adjustable amount of raising vehicle height is increased and thus target vehicle height changing rate (expanding side) Hduex can be increased. Accordingly, the effect of increasing wheel load by raising vehicle height increases. Consequently, the effect of increasing the friction force of tire under braking with respect to road surface increases and thus a higher deceleration is achieved.

In the above described embodiment, target vehicle height Ho is identical for all the four wheels (front and rear wheels). However, it is possible that a difference in target vehicle height lies between the front and rear wheels, and when an increase in wheel load caused by raising vehicle height is adapted to load shift during braking, the effect of increasing the friction force of tire under braking with respect to road surface can be made more remarkable.

Figure 16:
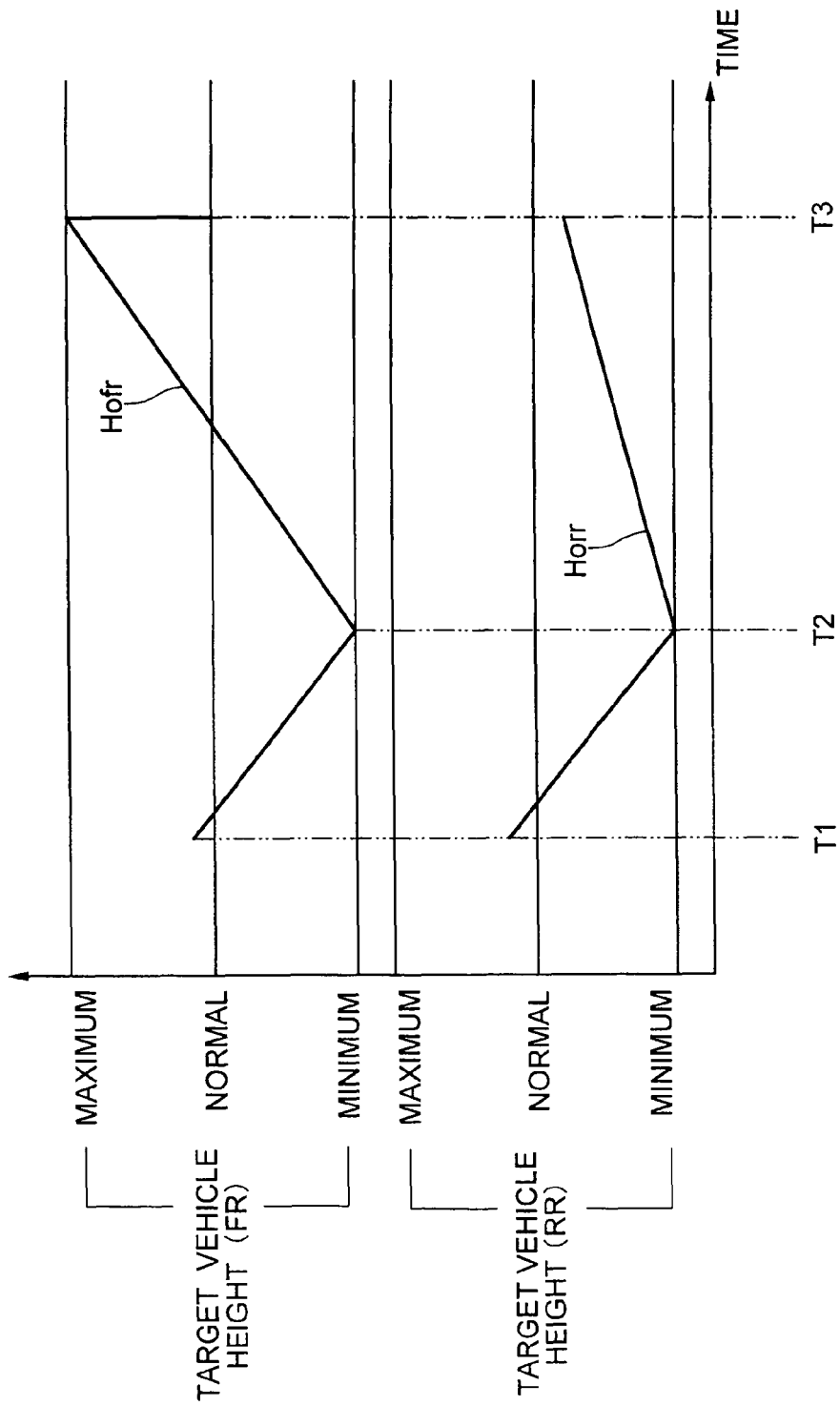
FIG. 16 is a time chart illustrating another example of target vehicle height calculation of the suspension control unit in the safety control apparatus for avoiding collision according to Embodiment 1.

In this case, as illustrated in FIG. 16, front wheel target vehicle height Hofr and rear wheel target vehicle height Horr are separately set; that is, target vehicle height changing rate (expanding side) Hduex is set separately for front wheel target vehicle height Hofr and rear wheel target vehicle height Horr; for front wheel target vehicle height Hofr, target vehicle height is lowered and thereafter raised to a target vehicle height upper limit, whereas for rear wheel target vehicle height Horr, target vehicle height is lowered and thereafter not raised to a target vehicle height upper limit.

In the present embodiment, there is described an example where target vehicle height is varied according to load shift during braking in the vehicle 100; but there may be a difference in target vehicle height between left and right wheels, or between opposite wheels. Alternatively, if necessary, there may be three or four kinds of target vehicle heights.

Embodiment 2

Embodiment 2 of a vehicle safety control apparatus for avoiding collision according to the present invention will be described with reference to FIGS. 17 to 23.

Figure 17:
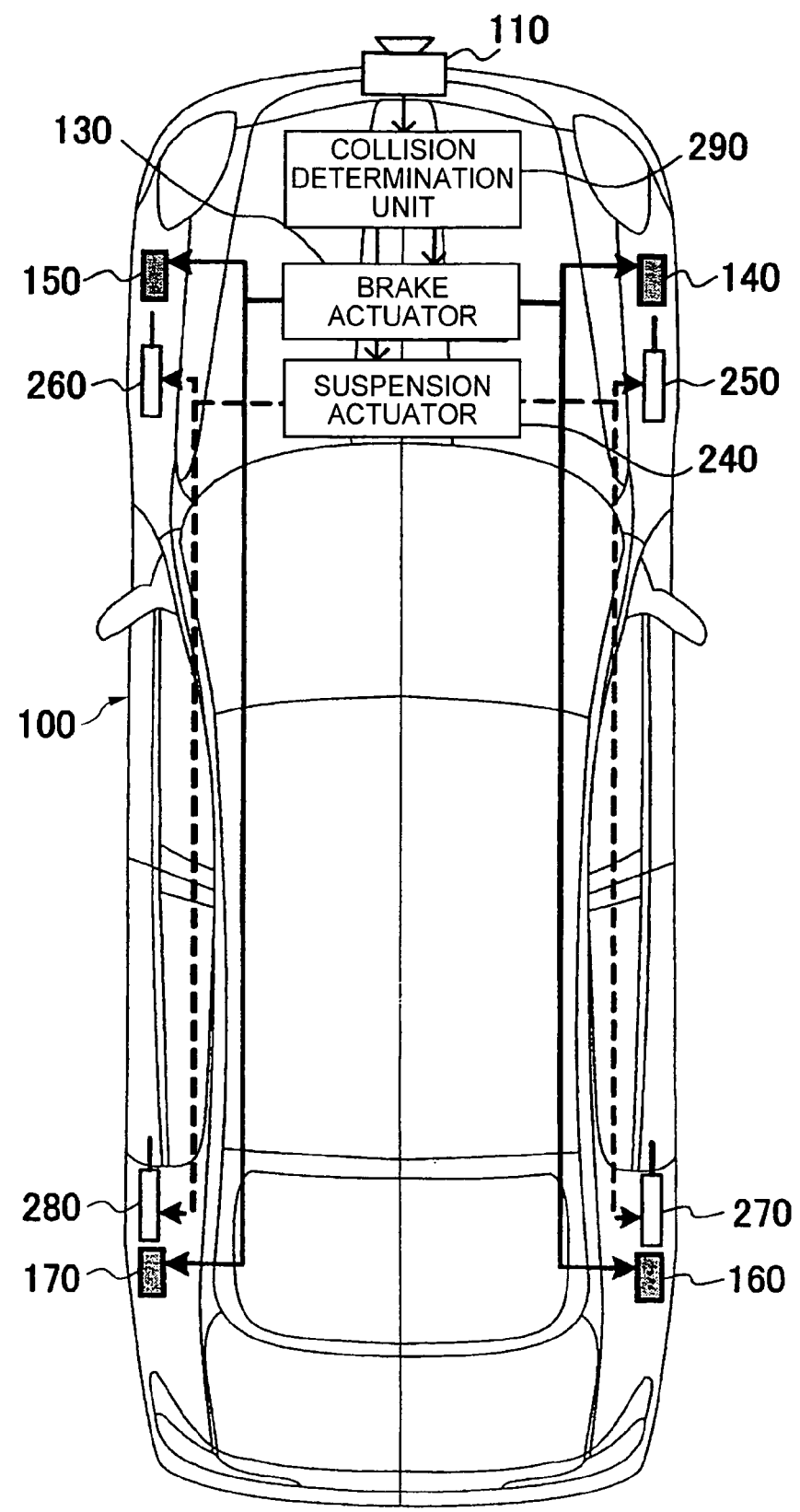
FIG. 17 is a view illustrating a configuration of a vehicle having mounted therein a safety control apparatus for avoiding collision according to Embodiment 2 of the present invention.

FIG. 17 illustrates a configuration of a vehicle having mounted therein the safety control apparatus for avoiding collision according to Embodiment 2. In FIG. 17, the same reference numerals are applied to parts corresponding to FIG. 1, and an explanation thereof is omitted.

A vehicle 100 includes: a headway distance/relative speed detection unit 110 using a radar; a collision determination unit 290 determining a collision with the preceding vehicle; a brake actuator 130 controlling brakes 140, 150, 160, 170; and a suspension actuator 240 controlling damping coefficient variable type suspensions 250, 260, 270, 280.

Figure 18:
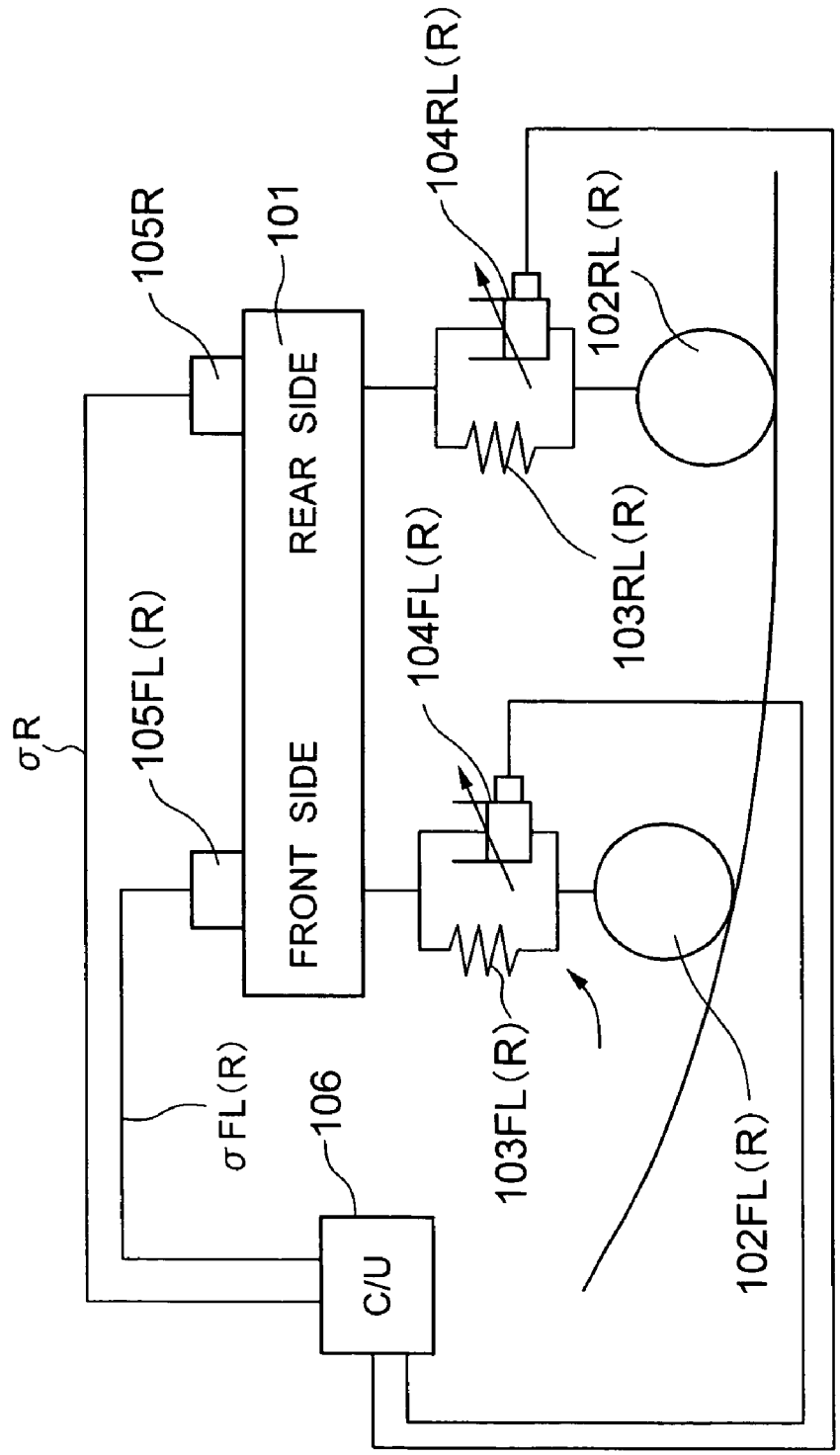
FIG. 18 is a view illustrating a configuration of a suspension system of the vehicle having mounted therein the safety control apparatus for avoiding collision according to Embodiment 2.
Figure 19:
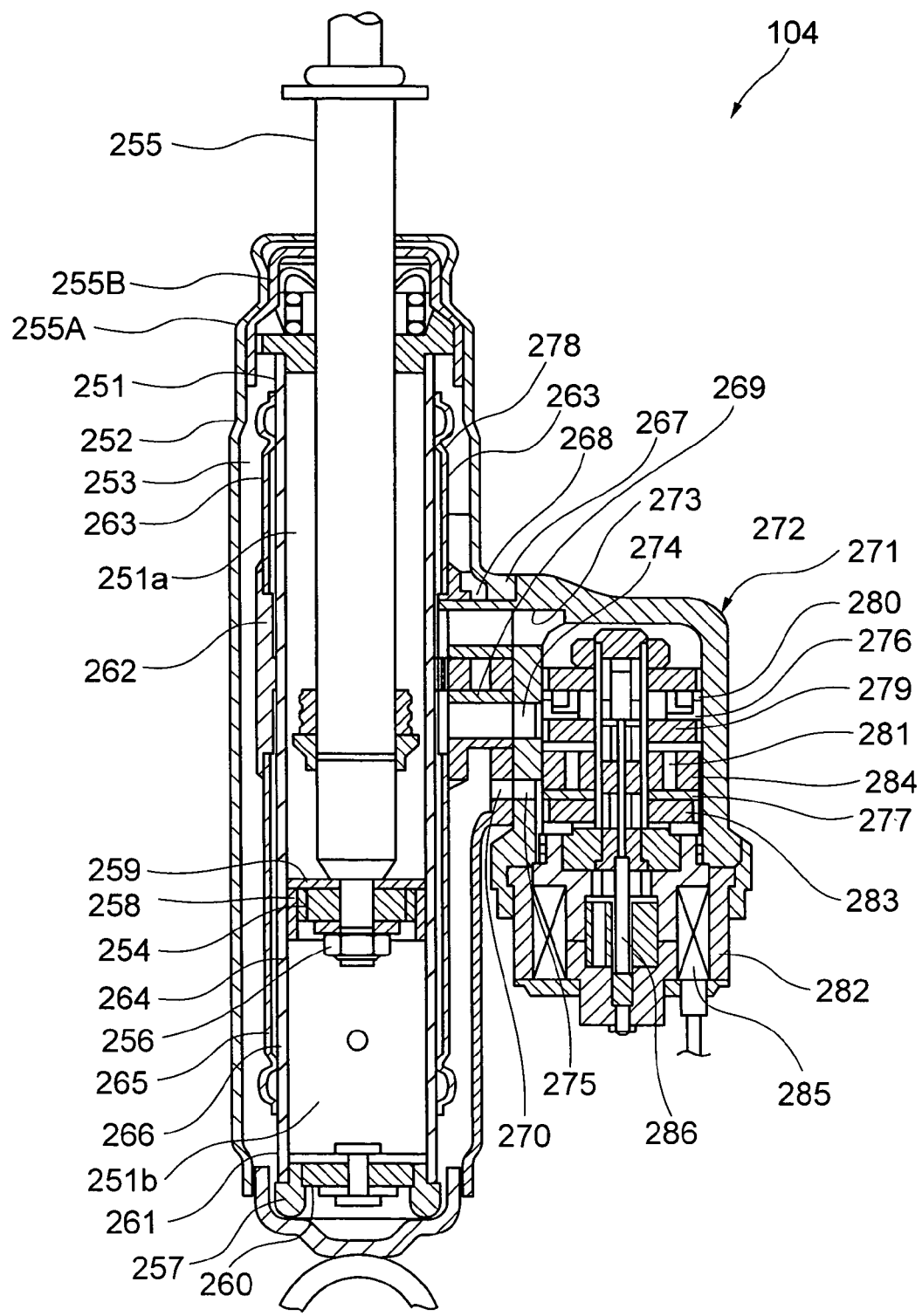
FIG. 19 is a view illustrating a configuration of a damping coefficient variable type shock absorber of the suspension system of the vehicle having mounted therein the safety control apparatus for avoiding collision according to Embodiment 2.

According to the present embodiment, as illustrated in FIG. 18, between a vehicle body 101 (sprung) and front/rear left/right wheels 102FL(R), 102RL(R) (unsprung) constituting the vehicle, there are arranged in parallel springs 103FL(R), 103RL(R) and damping coefficient variable type shock absorbers 104FL(R), 104RL(R) of expansion/contraction inversion type, respectively, and these support the vehicle body 101.

Here, the spring 103FL(R) and the damping coefficient variable type shock absorber 104FL(R) constitute the suspensions 250, 260; and the spring 103RL(R) and the damping coefficient variable type shock absorber 104RL(R) constitute the suspensions 270, 280.

In the vehicle body 101, there are mounted acceleration sensors (front/rear side vertical acceleration detection units) 105FL(R), 105R (only one sensor being in the rear side) which detect sprung accelerations αFL(R), αR (vertical acceleration) in the front/rear left/right sides of the vehicle body 101. Acceleration signals of the acceleration sensors 105FL(R), 105R are supplied to a controller 106. In FIG. 18, only a pair of wheels (two left wheels) in the front and rear sides are illustrated for convenience.

The damping coefficient variable type shock absorbers 104FL(R), 104RL(R) have the same configuration. Thus, using reference numeral 104, only one of them will be described in detail with reference to FIG. 19.

The damping coefficient variable type shock absorbers 104 has a double-cylinder structure provided with a cylinder tube 251 and an outer cylinder 252; and a reserver 253 is formed between the cylinder tube 251 and the outer cylinder 252.

A piston 254 is slidably fit in the cylinder tube 251; and the interior of the cylinder tube 251 is partitioned into a cylinder upper chamber 251a and a cylinder lower chamber 251b by this piston 254.

One end of a piston rod 255 is coupled to the piston 254 with a nut 256. The other end of the piston rod 255 passes through the cylinder upper chamber 251a and is inserted into the cylinder tube 251, a rod guide 255A attached to the upper end of the outer cylinder 252 and a sealing member 255B, and extends outside the cylinder tube 251.

In the lower end of the cylinder tube 251, there is arranged a base valve 257 separating the cylinder lower chamber 251b and the reserver 253. Fluid is put in the cylinder tube 251; and fluid and gas are put in the reserver 253.

In the piston 254, there are arranged a fluid path 258 through which the cylinder upper and lower chambers 251a, 251b communicate with each other and an one-way valve 259 of the fluid path 258 permitting only fluid flow from the cylinder lower chamber 251b to the cylinder upper chamber 251a.

In the base valve 257, there are arranged a fluid path 260 through which the cylinder lower chamber 251b and the reserver 253 communicate with each other and an one-way valve 261 of the fluid path 260 permitting only fluid flow from the reserver 253 to the cylinder lower chamber 251b.

In a central outer circumferential part of the cylinder tube 251, there is fit a substantially cylinder-shaped path member 262. In an upper outer circumferential part of the cylinder tube 251, there is fit an upper tube 263; and the upper tube 263 is joined to the path member 262, forming a circular shaped fluid path to the cylinder tube 251. The circular shaped fluid path is made to communicate with the cylinder upper chamber 251a via a fluid path 278 arranged on a sidewall in the vicinity of the upper end of the cylinder tube 251.

In a lower outer circumferential part of the cylinder tube 251, there is fit a lower tube 264; and the lower tube 264 is joined to the path member 262, forming a circular shaped fluid path 265 to the cylinder tube 251. The circular shaped fluid path 265 communicates with the cylinder lower chamber 251b via a fluid path 266 arranged on a sidewall in the vicinity of the lower end of the cylinder tube 251.

In the outer cylinder 252, there is attached a connection plate 267 joined to the path member 262. In the connection plate 267 and path member 262, there are inserted and fit connection tubes 268, 269 communicating with the circular shaped fluid paths 263, 265, respectively. Further, in the connection plate 267, there is arranged a connection hole 270 communicating with the reserver 253.

A damping force generation mechanism 271 is attached to the connection plate 267. In a case 272 of the damping force generation mechanism 271, there are arranged fluid paths 273, 274, 275 communicating with the connection tubes 268, 269 and the connection hole, respectively.

Arranged in the case 272 are an expansion side damping valve 276 controlling fluid flow between the fluid paths 273, 274 to generate a damping force, and a contraction side damping valve 277 controlling fluid flow between the fluid paths 273, 275 to generate a damping force.

The fluid path 278, circular shaped fluid path 263, connection tube 268, fluid path 273, fluid path 274, connection tube 269, circular shaped fluid path 265 and fluid path 266 constitute a fluid path (expansion side fluid path) through which the cylinder upper and lower chamber 251a, 251b communicate with each other.

The fluid path 266, circular shaped fluid path 265, connection tube 269, fluid path 274, fluid path 275 and connection hole 270 constitute a fluid path (contraction side fluid path) through which the cylinder lower chamber 251b and the reserver 253 communicate with each other.

The expansion side damping valve 276 is constituted of a main valve 279 being a pilot type pressure control valve, a subvalve 280 being a pressure control valve, and a pilot valve 281 (spool valve) being a variable flux control valve. The pilot valve 281 is operated by a proportional solenoid type actuator 282 (hereinafter referred to as an actuator 282) to vary the fluid path area between the fluid paths 273, 274 and thereby allows adjustment of orifice characteristics (damping force being approximately proportional to piston speed squared); and, a pilot pressure is varied to vary a pressure of opening the main valve 279 and thereby allows adjustment of valve characteristics (damping force being approximately proportional to piston speed). The subvalve 280 serves to cause an appropriate damping force (valve characteristics) to be generated in a lower range of piston speed, i.e., in an orifice characteristics range.

The contraction side damping valve 277 is constituted of a main valve 283 being a pilot type pressure control valve, a subvalve 284 being a pressure control valve, and the pilot valve 281 shared by the expansion side damping valve 276. Similarly to the expansion side damping valve 276, the pilot valve 281 is operated by the actuator 282 to vary the fluid path area between the fluid paths 274, 275 and thereby allows adjustment of orifice characteristics); and, a pilot pressure is varied to vary a pressure of opening the main valve 283 and thereby allows adjustment of valve characteristics. The subvalve 284 serves to cause an appropriate damping force (valve characteristics) to be generated in a lower range of piston speed, i.e., in an orifice characteristics range.

Here, when the pilot valve 281 shared by the expansion side and contraction side is operated by the actuator 282 so that the pilot pressure exerted on the main valve 279 of the expansion side damping valve 276 rises, the pilot pressure exerted on the main valve 283 of the contraction side damping valve 277 lowers.

In contrast, when operated by the actuator 282 so that the pilot pressure exerted on the main valve 279 of the expansion side damping valve 276 lowers, the pilot pressure exerted on the main valve 283 of the contraction side damping valve 277 rises.

That is, when the pilot pressure exerted on the main valve 279 is raised, the expansion side damping force increases; on the other hand, when the pilot pressure exerted on the main valve 283 is lowered, the contraction side damping force decreases. In contrast, when the pilot pressure exerted on the main valve 279 is lowered, the expansion side damping force decreases; on the other hand, when the pilot pressure exerted on the main valve 283 is raised, the contraction side damping force increases.

The actuator 282 is an electromagnetic coil driving a movable piston 286 according to an amplitude of current supplied from the controller 106; the electromagnetic coil drives a movable pin 286 by a travel amount proportional to an amplitude of supplied current. When the movable pin 286 travels, the pilot valve 281 travels accordingly; when supplied current is small (the travel amount of the pilot valve 281 is small), the expansion side damping force is small but the contraction side damping force is set large.

In contrast, when supplied current is large (the travel amount of the pilot valve 281 is large), the expansion side damping force is large but the contraction side damping force is set small.

In accordance with a control signal I (supplied current) transmitted from a damping coefficient of the controller 106, the actuator 282 causes the movable pin 286 to operate.

Figure 20:
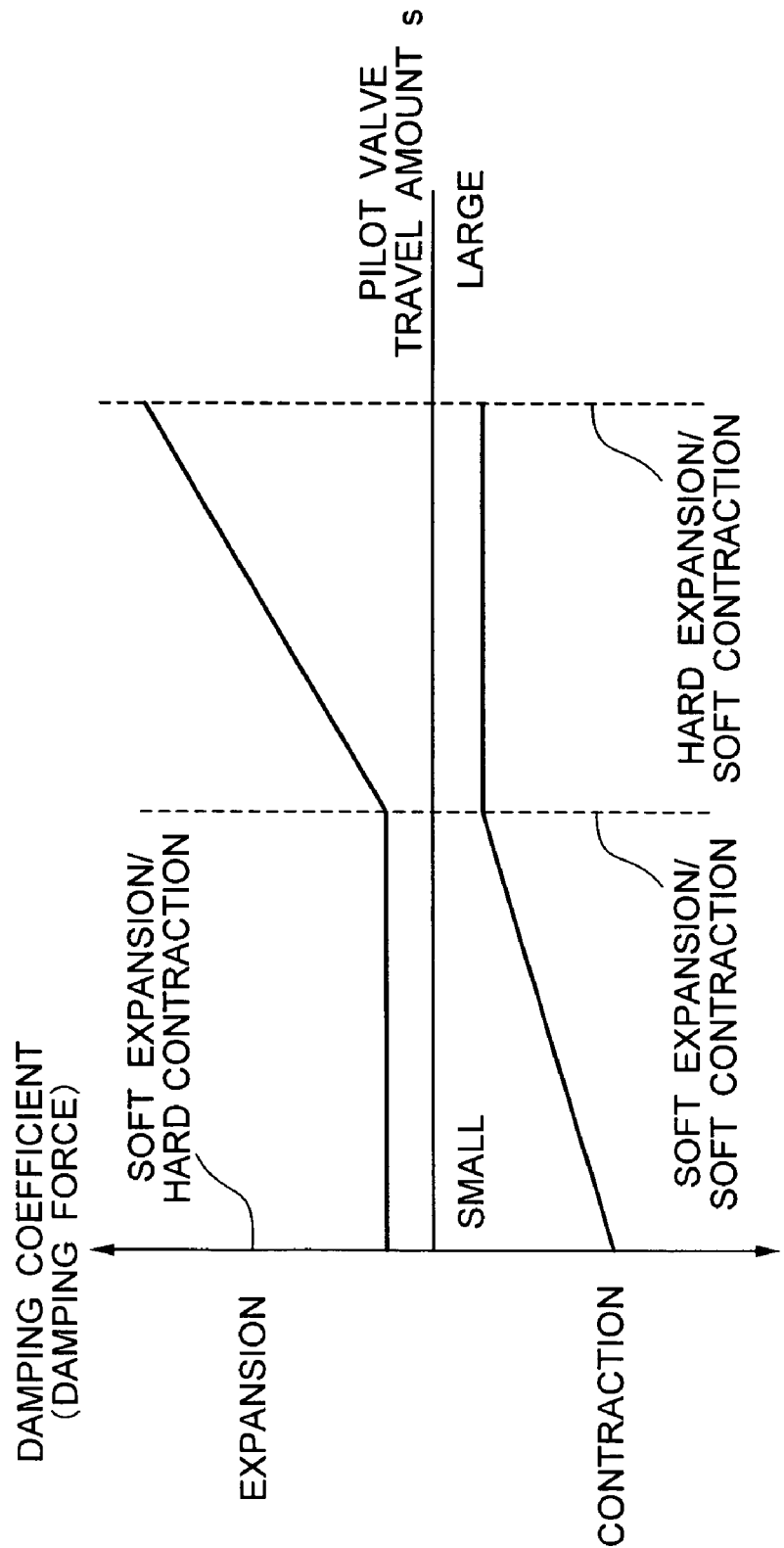
FIG. 20 is a characteristic chart illustrating a relationship between pilot valve travel amount and damping coefficient of the damping coefficient variable type shock absorber of the suspension system of the vehicle having mounted therein the safety control apparatus for avoiding collision according to Embodiment 2.

Damping coefficient (damping force) characteristics of the damping coefficient variable type shock absorber 104 are illustrated in FIG. 20. FIG. 20 depicts the amplitude of expansion side and contraction side damping coefficients (damping force) with respect to a travel amount s of the pilot valve 281.

The difference of the collision determination unit 290 of the present embodiment from the collision determination unit 120 of Embodiment 1 lies in the signal passed from the suspension control unit 1211 (refer to FIG. 8) to the suspension actuator 240 and the configuration of the suspension actuator 240.

In the collision determination unit 290 of the present embodiment, the suspension control unit 1211 sends a "soft expansion and hard contraction request" to the suspension actuator 240 to perform control so that the damping force of the shock absorber 104 changes to soft expansion and hard contraction.

Figure 21:
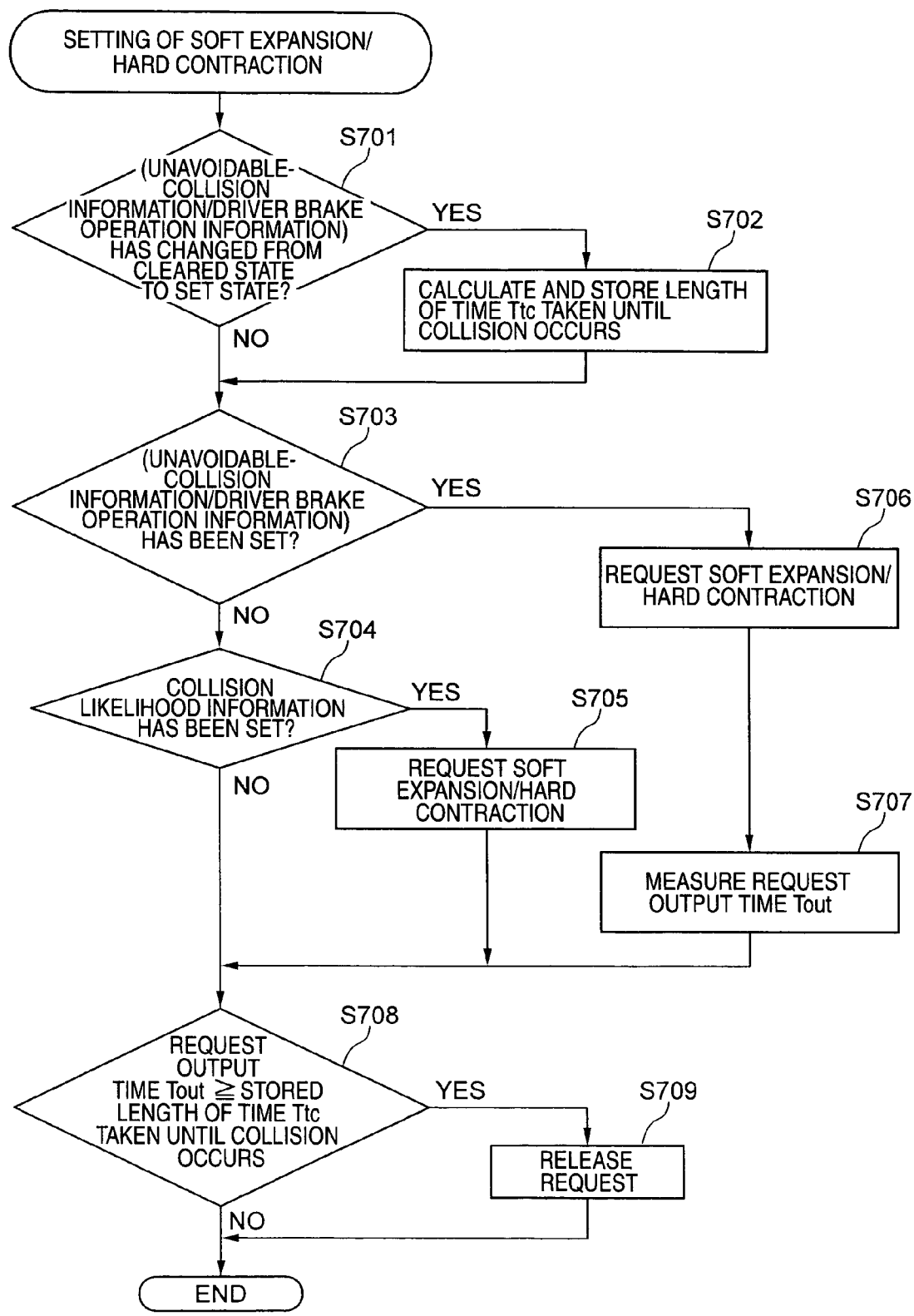
FIG. 21 is a flowchart illustrating an exemplary processing flow of a suspension control unit performing setting of soft expansion and hard contraction in the safety control apparatus for avoiding collision according to Embodiment 2.

The operation of the suspension control unit 1211 of Embodiment 2 will be described with reference to a flowchart of FIG. 21. In FIG. 21, also, steering unavoidable-collision signal and braking unavoidable-collision signal are collectively referred to as "unavoidable-collision information"; steering unavoidable-collision likelihood signal and braking unavoidable-collision likelihood signal are collectively referred to as "collision likelihood information".

First, it is determined whether unavoidable-collision information and driver brake operation information have changed from a cleared state to a set state (step S701). If it is determined that unavoidable-collision information and driver brake operation information have changed from a cleared state to a set state, a length of time Ttc taken until a collision occurs is calculated by the above described formula (5) and stored (step S702).

If it is determined that both unavoidable-collision information and driver brake operation information have not been set ("NO" in step S701, "NO" in step S703), it is determined whether collision likelihood information has been set (step S704). If collision likelihood information has been set, a "soft expansion and hard contraction request" is outputted (step S705).

In Embodiment 1, collision pre-determination margin time Tds is calculated from a length of time taken to vary a vehicle height, whereas in Embodiment 2, collision pre-determination margin time Tds is set to a length of time sufficient to vary the damping coefficient of the shock absorber 104.

If it is determined that unavoidable-collision information or driver brake operation information has been set ("YES" in step S703), a "soft expansion and hard contraction request" continues to be outputted (step S706) and at the same time, a request output time period Tout is measured (step S707). The method of measuring this request output time period Tout is similar to that of Embodiment 1.

And it is determined whether request output time period Tout has exceeded length of time Ttc taken until a collision occurs (step S708). When request output time period Tout has reached length of time Ttc taken until a collision occurs, the request is stopped (step S709).

As a result, at the time of braking (at the time of deceleration), the damping coefficient (damping force) characteristics of the shock absorber 104 are set to soft expansion and hard contraction.

Figure 22:
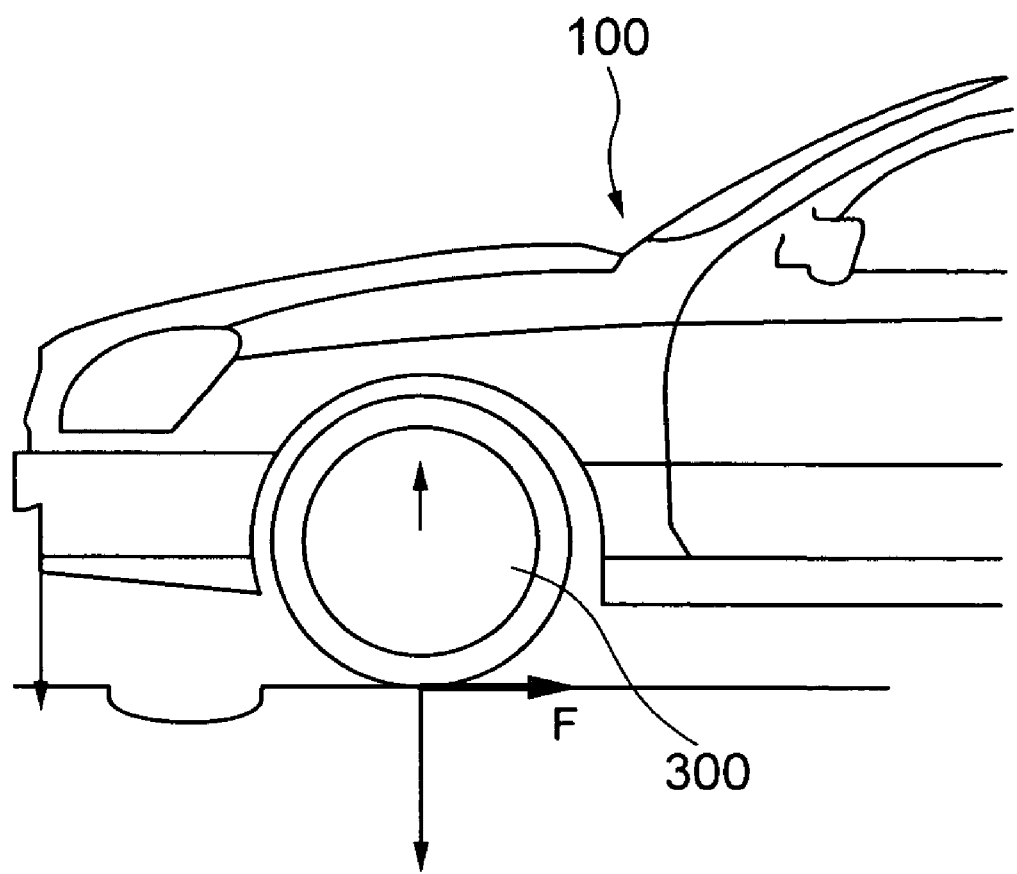
FIG. 22 is a view for explaining an effect of performing setting of soft expansion and hard contraction.

The effect of setting the damping coefficient (damping force) characteristics of the shock absorber 104 to soft expansion and hard contraction will be described with reference to FIG. 22.

Friction force F exerted on the tire 300 of the vehicle 100 is expressed as the following formula (7).

$$F = m\mu(G+A) \quad (7)$$

where m: gravity force exerted on wheel, μ: friction coefficient between road surface and tire, G: gravity acceleration, A: acceleration Acceleration A is the sum of an acceleration Abrk in a vertical direction of the vehicle 100 produced by applying the braking and a contraction acceleration Ad of the shock absorber 104 (A=Abrk+Ad).

Here, since m, μ and G are a fixed value, as acceleration A increases, friction force F exerted on the tire 300 increases; as acceleration A decreases, friction force F exerted on the tire 300 decreases.

Acceleration A is the sum of acceleration Abrk and acceleration Ad, so when acceleration Ad (having a reverse sign to that of acceleration A) is decreased, friction force F exerted on the tire 300 increases and thus braking distance can be shortened.

If the expansion side damping force of the shock absorber 104 is increased, when there are holes on the road surface, the tire 300 does not make contact with the road surface and thus braking distance is prolonged. Accordingly, the expansion side damping force of the shock absorber 104 is adjusted to "soft" in contrast to the contraction side.

As described above, the collision estimation and determination is performed by the collision determination unit 290, whereby along with the deceleration control of the self vehicle by applying the brake being performed by the brake actuator 130 to reduce impact upon collision, the damping coefficient of the shock absorber 104 is varied to increase wheel load, and the friction force of tire under braking with respect to road surface increases accordingly. Consequently, braking effect is improved and a high deceleration is achieved. Accordingly, braking distance can be shortened, further reducing vehicle speed at the time of collision and further reducing collision impact.

Also, when steering unavoidable-collision likelihood determination or braking unavoidable-collision likelihood determination is performed, control of varying the damping coefficient of the shock absorber 104 is performed prior to a start of deceleration, so at the time of starting deceleration, the control of varying the damping coefficient of the shock absorber 104 has been completed and thus the operation of increasing the friction force of tire under braking with respect to road surface can be obtained starting just after braking is started, improving the effect of shortening braking distance.

In the above described embodiment, a "soft expansion and hard contraction request" is outputted to the all the front/rear shock absorbers 104. However, as illustrated in FIG. 23, it is possible that a "soft expansion and hard contraction request" is outputted to the front shock absorbers 104, and a "hard expansion and soft contraction request" is outputted to the rear shock absorbers 104.

Figure 23:
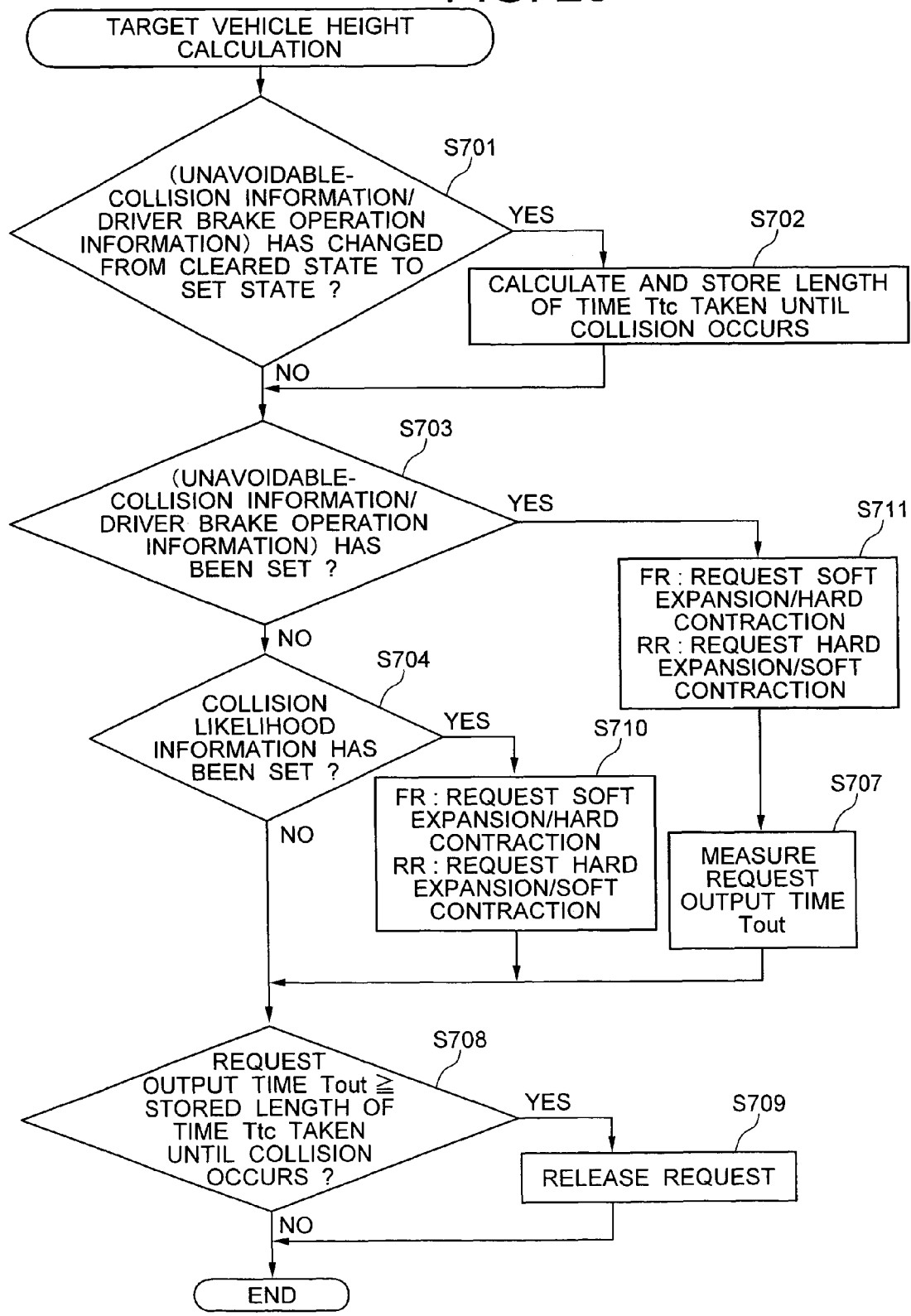
FIG. 23 is a flowchart illustrating another exemplary processing flow of the suspension control unit performing setting to soft expansion and hard contraction in the safety control apparatus for avoiding collision according to Embodiment 2.

The difference of the flowchart illustrated in FIG. 23 from the flowchart illustrated in FIG. 21 lies in steps S710 and S711 of outputting a request; and in the flowchart illustrated in FIG. 23, the same step numbers are applied to parts corresponding to the flowchart illustrated in FIG. 21, and an explanation thereof is omitted.

The effect obtained when the rear shock absorbers are adjusted to hard expansion and soft contraction will now be described. When the rear shock absorbers are adjusted to soft expansion similarly to the front shock absorbers, there is a tendency that front side vehicle height decreases and rear side vehicle height increases during application of the brake. When such phenomenon occurs, the vehicle load is unevenly distributed to the front side, and the rear load decreases, that is, changes to a value of gravity m exerted on the rear wheels.

The front load increases with decreasing rear load, but friction force F between the tire and road surface has a limit value; after friction force F has reached its limit value, even when the value of the right term of formula (7) is increased, friction force F does not increase.

Accordingly, there occurs a phenomenon that, during braking, when there occurs a state where with the load being shifted to the front side, friction force F between the front tire and road surface has reached its limit but friction force F between the rear tire and road surface has not reached its limit, then friction force F of the whole vehicle with respect to road surface lowers.

To solve this problem, the damping factor of the rear side shock absorbers is adjusted to hard expansion and soft contraction and the shifting of load to the front side is suppressed, whereby friction force F of the whole vehicle with respect to road surface is prevented from lowering.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A safety control apparatus for avoiding collision used in a vehicle comprising:
   a headway distance/relative speed detection unit measuring a distance and relative speed between the vehicle and an obstacle;
   a collision determination unit estimating and determining a collision with the obstacle based on the distance and relative speed measured by the headway distance/relative speed detection unit;
   a brake actuator controlling a brake to perform deceleration; and
   a suspension actuator controlling a suspension to vary one of or both a vehicle height and a damping coefficient of a shock absorber,
   wherein the collision estimation and determination is performed by the collision determination unit, vehicle deceleration control is performed by the brake actuator by applying the brake to reduce impact upon collision, and vehicle wheel load is controlled by the suspension actuator,
   wherein prior to the collision estimation and determination by the collision determination unit, a collision likelihood determination is performed by the collision determination unit, and when it is determined that a collision is likely, the vehicle wheel load control is initiated by the suspension actuator prior to initiation of the deceleration control by the brake actuator, and
   wherein, prior to performing the deceleration control, the vehicle wheel load is controlled by the suspension actuator, such that the damping coefficient of the shock absorber is controlled by the suspension actuator to have a soft expansion and a hard contraction while maintaining a constant vehicle deceleration.

2. A safety control apparatus for avoiding collision used in a vehicle comprising:
   a headway distance/relative speed detection unit measuring a distance and relative speed between the vehicle and an obstacle;
   a collision determination unit estimating and determining a collision with the obstacle based on the distance and relative speed measured by the headway distance/relative speed detection unit;

a brake actuator controlling a brake to perform deceleration; and a suspension actuator controlling a suspension to vary one of or both a vehicle height and a damping coefficient of a shock absorber, wherein the collision estimation and determination is performed by the collision determination unit, vehicle deceleration control is performed by the brake actuator by applying the brake to reduce impact upon collision, vehicle wheel load is controlled by the suspension actuator, and control of varying a damping coefficient of the shock absorber is performed by the suspension actuator, wherein prior to the collision estimation and determination by the collision determination unit, a collision likelihood determination is performed by the collision determination unit, and when it is determined that a collision is likely, the vehicle wheel load control is initiated by the suspension actuator prior to initiation of the deceleration control by the brake actuator, and wherein, prior to performing the deceleration control, the vehicle wheel load is controlled by the suspension actuator, such that the damping coefficient of the shock absorber is controlled by the suspension actuator to have a soft expansion and a hard contraction while maintaining a constant vehicle deceleration.

3. The safety control apparatus for avoiding collision according to claim 2, wherein along with the deceleration control, control of setting a damping coefficient of the shock absorber to soft expansion and hard contraction is performed by the suspension actuator.

4. The safety control apparatus for avoiding collision according to claim 2, wherein along with the deceleration control, the following control is performed by the suspension actuator; that is, a damping coefficient of the shock absorber in a front side is set to soft expansion and hard contraction, and a damping coefficient of the shock absorber in a rear side is set to hard expansion and soft contraction.

5. The safety control apparatus for avoiding collision according to claim 2, wherein prior to the collision estimation and determination by the collision determination unit, collision likelihood determination is performed by the collision determination unit, and when it is determined that a collision is likely, control of varying a damping coefficient of the shock absorber is preliminarily performed by the suspension actuator.

* * * * *